US012708911B2

(12) United States Patent
Kang et al.

(10) Patent No.: US 12,708,911 B2
(45) Date of Patent: Aug. 18, 2026

(54) DUST COLLECTION SHEET AND ELECTROSTATIC PRECIPITATOR

(71) Applicant: SAMSUNG ELECTRONICS CO., LTD., Suwon-si (KR)

(72) Inventors: Myungsoo Kang, Suwon-si (KR); Sangmo Kang, Suwon-si (KR); Hyongsoo Noh, Suwon-si (KR); Myungseob Song, Suwon-si (KR); Kyuho Shin, Suwon-si (KR); Joonoh Shin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 257 days.

(21) Appl. No.: 18/444,145

(22) Filed: Feb. 16, 2024

(65) Prior Publication Data

US 2024/0351049 A1 Oct. 24, 2024

Related U.S. Application Data

(63) Continuation of application No. PCT/KR2024/001345, filed on Jan. 29, 2024.

(30) Foreign Application Priority Data

Apr. 20, 2023 (KR) ........................ 10-2023-0052002

(51) Int. Cl.
*B03C 3/12* (2006.01)
*B03C 3/08* (2006.01)
(Continued)

(52) U.S. Cl.
CPC .................. *B03C 3/47* (2013.01); *B03C 3/08* (2013.01); *B03C 3/12* (2013.01); *B03C 3/32* (2013.01);
(Continued)

(58) Field of Classification Search
CPC .... B03C 3/08; B03C 3/12; B03C 3/32; B03C 3/38; B03C 3/40; B03C 3/41; B03C 3/47; B03C 3/60; B03C 3/64
(Continued)

(56) References Cited

U.S. PATENT DOCUMENTS 8,470,084 B2 6/2013 Ji et al.
8,580,017 B2 11/2013 Noh et al.
(Continued)

FOREIGN PATENT DOCUMENTS

JP 2001-25682 A 1/2001
JP 2006289337 A * 10/2006
(Continued)

OTHER PUBLICATIONS

International Search Report dated May 10, 2024, issued by the International Searching Authority in International Application No. PCT/KR2024/001345.
(Continued)

*Primary Examiner* — Frank M Lawrence, Jr.
(74) *Attorney, Agent, or Firm* — Sughrue Mion, PLLC

(57) ABSTRACT

A dust collection sheet includes: a first electrode extending in a first direction from an upper stream of an air flow path toward a lower stream of the air flow path, the first electrode including a first electrode layer to which a first voltage is applied and a first dielectric layer covering the first electrode layer; a second electrode disposed in a second direction orthogonal to the first direction, the second electrode including a second electrode layer to which a second voltage is applied and a second dielectric layer covering the second electrode layer, wherein the second voltage is different from the first voltage; and a third electrode disposed parallel to the second electrode in the first direction, the third electrode including a third electrode layer to which a third voltage is
(Continued)

applied and a third dielectric layer covering the third electrode layer.

20 Claims, 18 Drawing Sheets

(51) Int. Cl.

| | |
|---|---|
| ***B03C 3/32*** | (2006.01) |
| ***B03C 3/38*** | (2006.01) |
| ***B03C 3/41*** | (2006.01) |
| ***B03C 3/47*** | (2006.01) |
| ***B03C 3/60*** | (2006.01) |
| ***B03C 3/64*** | (2006.01) |

(52) U.S. Cl.
CPC .................. *B03C 3/38* (2013.01); *B03C 3/41* (2013.01); *B03C 3/60* (2013.01); *B03C 3/64* (2013.01)

(58) Field of Classification Search
USPC .............................. 96/15, 75, 98–100; 95/57
See application file for complete search history.

(56) References Cited

U.S. PATENT DOCUMENTS

| | | | |
|---|---|---|---|
| 8,690,996 | B2 | 4/2014 | Ji et al. |
| 10,933,431 | B2 | 3/2021 | Kochiyama et al. |
| 10,994,283 | B2 | 5/2021 | Noh et al. |
| 2010/0147151 | A1 | 6/2010 | Ji et al. |
| 2011/0185905 | A1 | 8/2011 | Ji et al. |
| 2017/0120255 | A1 | 5/2017 | Cho et al. |
| 2018/0250685 | A1 | 9/2018 | Noh et al. |
| 2019/0346357 | A1 | 11/2019 | Mizuno et al. |
| 2020/0023377 | A1 | 1/2020 | Kochiyama et al. |
| 2021/0283621 | A1 | 9/2021 | Tomimatsu et al. |
| 2023/0097963 | A1 | 3/2023 | Kang et al. |
| 2023/0149948 | A1* | 5/2023 | Shin .......................... B03C 3/47 95/33 |

FOREIGN PATENT DOCUMENTS

| | | | |
|---|---|---|---|
| KR | 10-0281769 | B1 | 3/2001 |
| KR | 10-2010-0067572 | A | 6/2010 |
| KR | 10-2012-0136795 | A | 12/2012 |
| KR | 10-1535148 | B1 | 7/2015 |
| KR | 10-1610854 | B1 | 4/2016 |
| KR | 10-1655452 | B1 | 9/2016 |
| KR | 10-2017-0059125 | A | 5/2017 |
| KR | 10-2018-0101844 | A | 9/2018 |
| KR | 10-2019-0005443 | A | 1/2019 |
| KR | 10-2019-0021740 | A | 3/2019 |
| KR | 10-2014139 | B1 | 8/2019 |
| KR | 10-2020-0139639 | A | 12/2020 |
| KR | 10-2336514 | B1 | 12/2021 |
| KR | 10-2409978 | B1 | 6/2022 |
| KR | 10-2431701 | B1 | 8/2022 |
| KR | 10-2442005 | B1 | 9/2022 |
| KR | 10-2022-0150528 | A | 11/2022 |
| KR | 10-2466669 | B1 | 11/2022 |
| KR | 10-2023-0072371 | A | 5/2023 |
| KR | 10-2024-0025860 | A | 2/2024 |

OTHER PUBLICATIONS

Written Opinion dated May 10, 2024, issued by the International Searching Authority in International Application No. PCT/KR2024/001345.

Communication dated Mar. 17, 2026., issued by the European Patent Office in European Application No. 24792792.4.

* cited by examiner

DUST COLLECTION SHEET AND ELECTROSTATIC PRECIPITATOR

CROSS-REFERENCE TO RELATED APPLICATIONS

This application is a by-pass continuation of International Application No. PCT/KR2024/001345, filed on Jan. 29, 2024, which is based on and claims priority to Korean Patent Application No. 10-2023-0052002, filed on Apr. 20, 2023, in the Korean Intellectual Property Office, the disclosures of which are incorporated by reference herein in their entireties.

BACKGROUND

1. Field

The disclosure relates to a dust collection sheet and an electrostatic precipitator.

2. Description of Related Art

High-concentration aerosols may cause health problems in closed spaces such as homes, rooms, shopping malls, factories, and offices. These aerosols may be generated by smoking, cooking, cleaning, welding, grinding, etc. in confined spaces.

An electrostatic precipitator is a device for removing such aerosols and may be used in air purifiers or air conditioners with an air purifying function.

The electrostatic precipitator may include a charging unit for charging aerosols in the air through discharge, and a dust collection unit consisting of a high-voltage electrode and a low-voltage electrode to collect aerosol charged by the charging unit.

SUMMARY

Provided are a dust collection sheet and an electrostatic precipitator capable of charging and collecting aerosols in the air.

Further, provided are a dust collection sheet and an electrostatic precipitator capable of having a simple structure and being easily manufactured.

Further still, provided are a dust collection sheet and an electrostatic precipitator capable of being slim to increase space utilization.

Additional aspects will be set forth in part in the description which follows and, in part, will be apparent from the description, or may be learned by practice of the presented embodiments.

According to an aspect of the disclosure, a dust collection sheet includes: a first electrode extending in a first direction from an upper stream of an air flow path toward a lower stream of the air flow path, the first electrode including a first electrode layer to which a first voltage is applied and a first dielectric layer covering the first electrode layer; a second electrode disposed in a second direction orthogonal to the first direction, the second electrode including a second electrode layer to which a second voltage is applied and a second dielectric layer covering the second electrode layer, wherein the second voltage is different from the first voltage; and a third electrode disposed parallel to the second electrode in the first direction, the third electrode including a third electrode layer to which a third voltage is applied and a third dielectric layer covering the third electrode layer, wherein the third voltage is different from the second voltage, wherein the second electrode further includes a discharge portion, the discharge portion including a portion of the second electrode layer that is not covered by the second dielectric layer, and the third electrode includes a corresponding portion facing the discharge portion, the corresponding portion including a portion of the third electrode layer that is not covered by the third dielectric layer, wherein the corresponding portion is configured to cause a charging action to occur with the discharge portion.

The discharge portion and the corresponding portion may be arranged in a straight line with respect to the first direction.

The second electrode and the third electrode may be on the same plane.

The third electrode may be spaced apart from the second electrode in a direction opposite to the first direction to form an electrification space between the discharge portion and the corresponding portion.

The second electrode may further include a first end and a second end, and the first end of the second electrode is on the upper stream side of the second end of the second electrode relative to the first direction, the third electrode may include a first end and a second end, and the second end of the third electrode is on the lower stream side of the first end of the third electrode relative to the first direction, and the discharge portion may be at the first end of the second electrode and the corresponding portion is disposed at the second end of the third electrode.

The first electrode may include a first end and a second end, and the second end of the first electrode is on the lower stream side of the first end of the first electrode relative to the first direction, and a length from the first end of the third electrode to the second end of the second electrode, along the first direction, may be longer than a length from the first end of the first electrode to the second end of the first electrode.

An upper surface and a lower surface of the second electrode layer may be inside the second dielectric layer on opposite sides of the second electrode in the second direction, and an upper surface and a lower surface of the third electrode layer may be inside the third dielectric layer on opposite sides of the third electrode in the second direction.

The discharge portion may be on a side surface of the second electrode layer connecting the upper surface and the lower surface of the second electrode layer, and the corresponding portion may be on a side surface of the third electrode connecting the upper surface and the lower surface of the third electrode layer.

An area of the dust collection sheet in a third direction orthogonal to the first direction and the second direction may be reduced based on a reduction in a distance between the discharge portion and the corresponding portion.

The discharge portion may have a triangular shape with a vertex being a point closest to the corresponding portion in the first direction.

The corresponding portion may extend in a straight line along a third direction orthogonal to the first direction and the second direction.

The first electrode may include a first dust collection portion configured to collect aerosols, the second electrode may include a second dust collection portion configured to form an electric field with the first dust collection portion, and the second dust collection portion may extend from the discharge portion.

The discharge portion and the second dust collection portion may be formed integrally.

The dust collection sheet may further include: one or more second electrodes including the second electrode; and one or more third electrodes including the third electrode, and a number of the one or more third electrodes is equal to a number of the one or more second electrodes.

According to an aspect of the disclosure, a dust collection sheet includes: a plurality of first electrodes extending in a first direction, wherein each first electrode of the plurality of first electrodes includes: a first electrode layer configured to receive a first voltage; and a first dielectric layer covering a portion of the first electrode layer; a plurality of second electrodes, wherein each second electrode of the plurality of second electrodes includes: a second electrode layer configured to receive a second voltage; a second dielectric layer covering a portion of the second electrode layer; and a discharge portion including a portion of the second electrode layer that is not covered by the second dielectric layer; and a plurality of third electrodes, wherein each third electrode of the plurality of third electrodes includes: a third electrode layer configured to receive a third voltage; a third dielectric layer covering a portion of the third electrode layer; and a corresponding portion including a portion of the third electrode layer that is not covered by the third dielectric layer, wherein each second electrode of the plurality of second electrodes is adjacent to a first electrode of the plurality of first electrodes in a second direction, the corresponding portion of each third electrode of the plurality of third electrodes faces the discharge portion of a second electrode of the plurality of second electrodes, each third electrode of the plurality of third electrodes is adjacent to a second electrode of the plurality of second electrodes in the first direction, the second voltage is different from the first voltage, and the third voltage is different from the second voltage, and the plurality of second electrodes and the plurality of third electrodes are configured to cause a charging action to occur with the discharge portion for each respective second electrode of the plurality of second electrodes.

The discharge portion of each second electrode of the plurality of second electrodes may be aligned in the first direction with the corresponding portion of a third electrode of the plurality of third electrodes.

Each second electrode of the plurality of second electrodes may be on the same plane as a third electrode of the plurality of third electrodes.

The dust collection sheet may further include an upstream side configured to receive an airflow; and a downstream side opposite from the upstream side, and each third electrode of the plurality of third electrodes may be spaced apart from a second electrode of the plurality of second electrodes in the first direction to form an electrification space between the discharge portion and the corresponding portion.

Each second electrode of the plurality of second electrodes may further include a first end and a second end, the first end of each second electrode of the plurality of second electrodes is on a side of the respective second electrode closest to the upstream side, each third electrode of the plurality of third electrodes may include a first end and a second end, the second end of each third electrode of the plurality of third electrodes is on a side of the respective third electrode closest to the downstream side, and the discharge portion of each second electrode of the plurality of second electrodes may be at the first end of the respective second electrode and the corresponding portion of each third electrode of the plurality of third electrodes may be at the second end of the respective third electrode.

The discharge portion of each second electrode of the plurality of second electrodes may have a saw-toothed shape.

BRIEF DESCRIPTION OF DRAWINGS

The above and other aspects, features, and advantages of certain embodiments of the present disclosure will be more apparent from the following description taken in conjunction with the accompanying drawings, in which.

DETAILED DESCRIPTION

Figure 1:
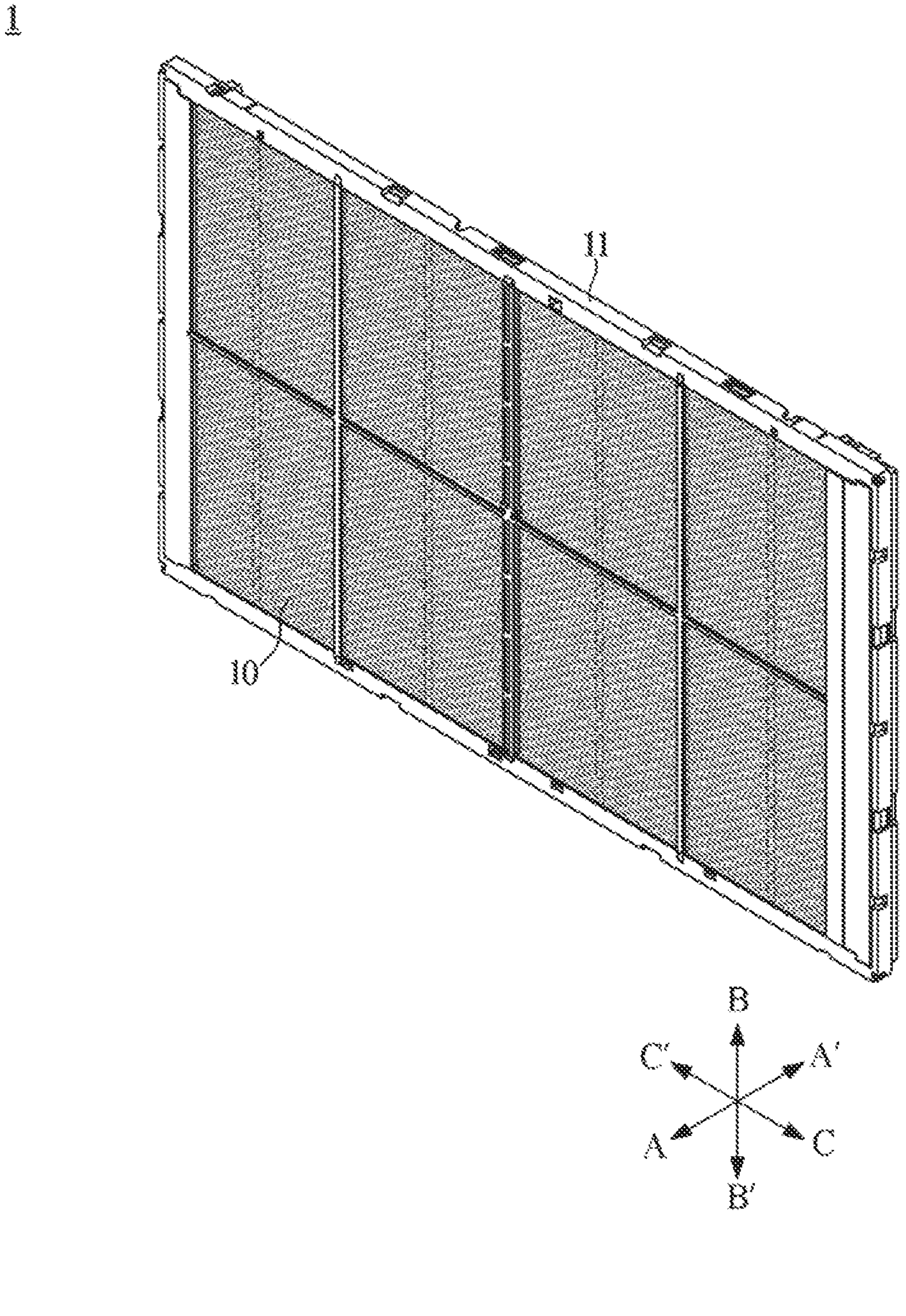
FIG. 1 is a perspective view of an electrostatic precipitator according to an embodiment.

The embodiments described in the present specification and the configurations shown in the drawings are only example embodiments of the present disclosure, and various modifications may be made at the time of filing of the present disclosure to replace the embodiments and drawings of the present specification.

Like reference numbers or signs in the various drawings of the application represent parts or components that perform substantially the same functions.

The terms used herein are for the purpose of describing the embodiments and are not intended to restrict and/or to limit the present disclosure. For example, the singular expressions herein may include plural expressions, unless the context clearly dictates otherwise. Also, the terms "comprises" and "has" are intended to indicate that there are features, numbers, steps, operations, components, parts, or combinations thereof described in the specification, and do not exclude the presence or addition of one or more other features, numbers, steps, operations, components, parts, or combinations thereof.

It will be understood that, although the terms "first," "second," etc. may be used herein to describe various components, these components should not be limited by these terms, and the terms are only used to distinguish one component from another. For example, without departing from the scope of the present disclosure, a first component may be referred to as a second component. The term "and/or" includes any combination of a plurality of related items or any one of a plurality of related items.

In this specification, the terms "front," "upper portion," "lower portion," "left side," "right side," and the like used in the following description are defined with reference to the drawings, and the shape and position of each component are not limited by these terms.

Hereinafter, embodiments of the present disclosure will be described in detail with reference to the accompanying drawings.

Herein, the expression "at least one of a, b or c" indicates "only a," "only b," "only c," "both a and b," "both a and c," "both b and c," or "all of a, b, and c."

An electrostatic precipitator 1 is a device for removing aerosols generated by activities such as smoking, cooking, cleaning, welding, and grinding within a certain space. The electrostatic precipitator 1 may be installed inside a device that may perform an air filtering function, such as an air conditioner and air purifier.

An air purifier or air conditioner may include an intake port through which the outside air is introduced, the electrostatic precipitator 1 provided to filter air introduced through the intake port, and a blowing fan provided to flow air. The air purifier or air conditioner may include a discharge port through which air filtered by a filter member is discharged. By the operation of the blowing fan, air may flow through the intake port, the electrostatic precipitator 1, and the discharge port.

A device such as an air purifier and air conditioner may include various filter devices in addition to the electrostatic precipitator 1. For example, a fine dust collection filter and/or a granular activated carbon filter in the form of a non-woven fabric made of polypropylene resin or polyethylene resin may be selectively provided.

Figure 2:
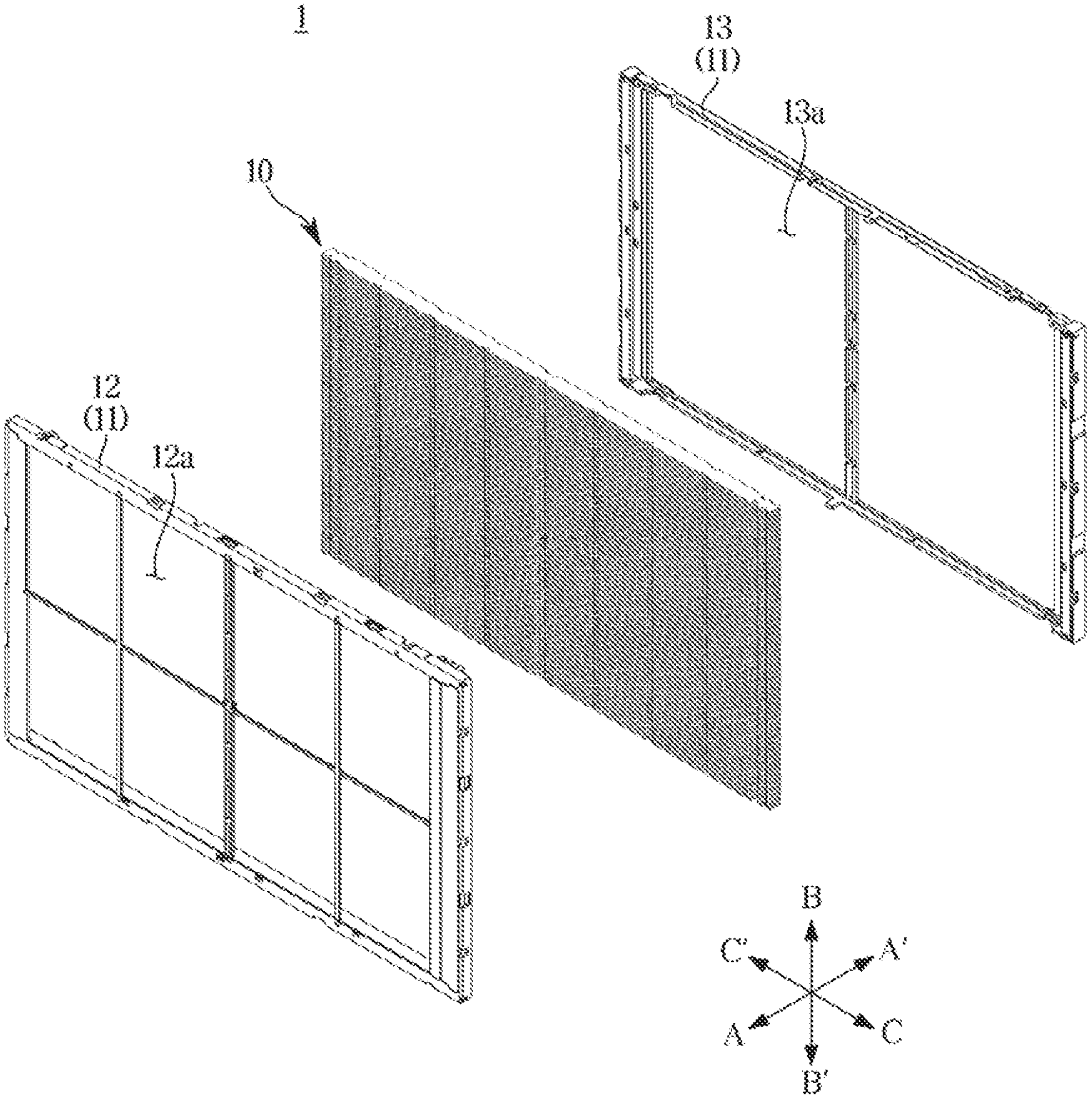
FIG. 2 is an exploded perspective view of the electrostatic precipitator according to an embodiment.

FIG. 1 is a perspective view of an electrostatic precipitator. FIG. 2 is an exploded perspective view of the electrostatic precipitator.

The electrostatic precipitator 1 may be provided to allow air to pass therethrough. Aerosols in the air may be collected in the electrostatic precipitator 1 while the air passes through the electrostatic precipitator 1.

An air flow path may be formed in the electrostatic precipitator 1, and a direction from an upper stream toward a lower stream of the air flow path may be defined as a first direction (A→A').

Because the drawings illustrate as an example that the electrostatic precipitator 1 is disposed perpendicular to the ground, air flows from the front to the rear, and thus the first direction (A→A') may be a direction from the front toward the rear.

However, the present disclosure is not limited thereto, and when the electrostatic precipitator 1 is disposed horizontally with the ground, air flows from a lower portion to an upper portion, and thus the first direction may be a direction from the lower portion to the upper portion.

The electrostatic precipitator 1 may include a dust collection sheet 10 and a frame 11 provided to support the dust collection sheet 10.

The frame 11 may have a shape surrounding an outer edge of the dust collection sheet 10. The frame 11 may include a first frame 12 and a second frame 13. The first frame 12 and the second frame 13 may be combined with each other. The dust collection sheet 10 may be provided between the first frame 12 and the second frame 13 and may be protected by the first frame 12 and the second frame 13.

The first frame 12, the dust collection sheet 10, and the second frame 13 may be arranged along the first direction (A→A'). For example, when the electrostatic precipitator 1 is disposed perpendicular to the ground, the first frame 12 may be provided in front of the dust collection sheet 10, and the second frame 13 may be provided in the rear of the dust collection sheet 10. Air may pass through the dust collection sheet 10 through openings 12*a* and 13*a* formed on inner sides of the first frame 12 and second frame 13, respectively.

Figure 3:
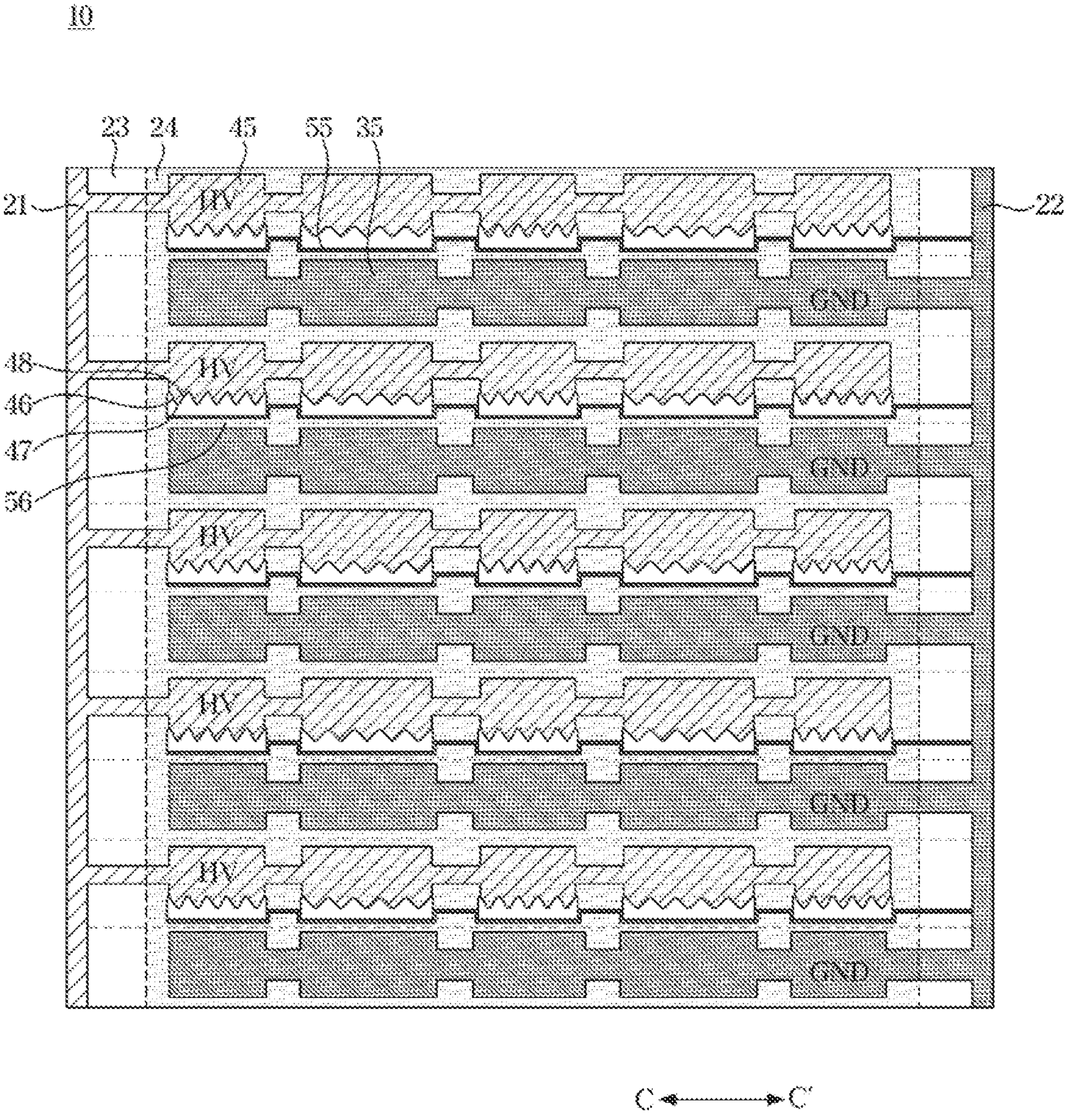
FIG. 3 is a plan view illustrating a state in which a dust collection sheet is unfolded according to an embodiment.
Figure 4:
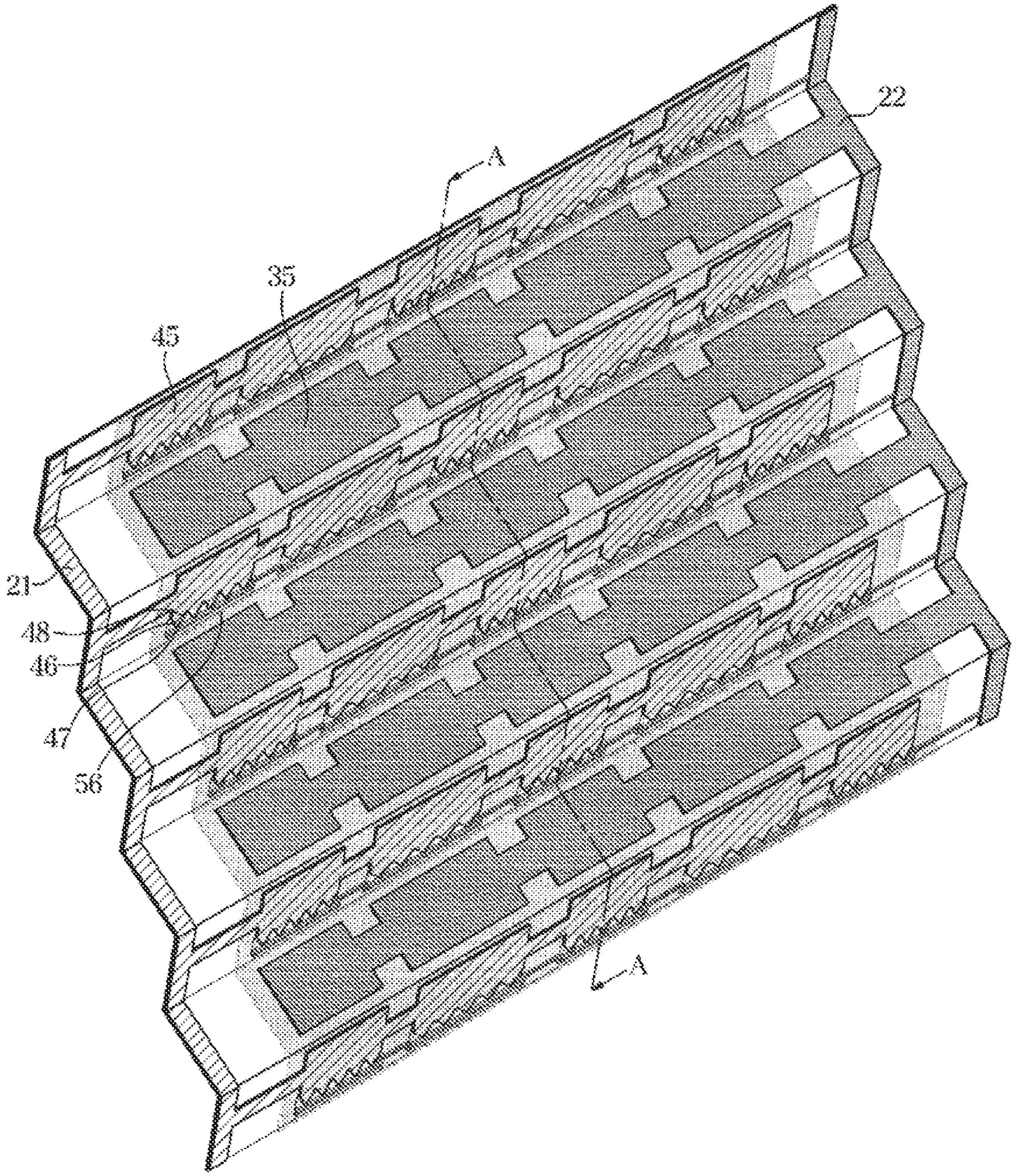
FIG. 4 is a perspective view illustrating a process of folding the dust collection sheet of FIG. 3 according to an embodiment.

FIG. 3 is a plan view illustrating a state in which a dust collection sheet is unfolded. FIG. 4 is a perspective view illustrating a process of folding the dust collection sheet of FIG. 3.

The dust collection sheet 10 may include a first sheet 23 and a second sheet 24. Electrode layers 35, 45, and 55 may be disposed between the first sheet 23 and the second sheet 24. The electrode layers 35, 45, and 55 may include the first electrode layer 35, the second electrode layer 45, and the third electrode layer 55.

The second sheet 24 may be coupled to one surface of the first sheet 23 on which the electrode layers 35, 45, and 55 are disposed. The first sheet 23 and the second sheet 24 may be combined to form the single dust collection sheet 10.

The first sheet 23 and/or the second sheet 24 may include a polyethyleneterephthalate (PET) film. However, the present disclosure is not limited thereto, and the first sheet 23 and/or the second sheet 24 may include a film of another material having insulating properties.

The first sheet 23 and the second sheet 24 may correspond to dielectric layers 31, 41, and 51 of FIGS. 6 to 8 and FIGS. 10 to 13.

The electrode layers 35, 45, and 55 may include a carbon thin film. However, the present disclosure is not limited thereto, and the electrode layers 35, 45, and 55 may include materials with conductivity such as copper, silver, and other metallic paints.

The electrode layers 35, 45, and 55 may be composed of a conductive pattern printed or deposited on one side of the first sheet 23, and may be formed by printing a conductive carbon thin film on one side of the first sheet 23 or depositing a conductive metal such as aluminum.

Power connection portions 21 and 22 may be disposed on one side of the first sheet 23 so that a power source may be connected to the electrode layers 35, 45, and 55 to apply a voltage. The power connection portions 21 and 22 may include the first power connection portion 21 and the second power connection portion 22.

The first power connection portion 21 may be connected to the second electrode layer 45, and the second power connection portion 22 may be connected to the first electrode layer 35 and/or the third electrode layer 55.

Different voltages may be applied to the first power connection portion 21 and the second power connection portion 22. A high voltage may be applied to the first power connection portion 21, and a low voltage may be applied to the second power connection portion 22, or the second power connection portion 22 may be grounded.

A second electrode 40 may be cut such that one side thereof is open. The second electrode 40 may include a discharge portion 46 provided such that at least a portion of the second electrode layer 45 is exposed to the outside. The discharge portion 46 may be a portion where the second electrode layer 45 is exposed in the second electrode 40. The discharge portion 46 may be a portion where ions are released.

A third electrode 50 may be cut such that one side thereof is open. The third electrode 50 may include a corresponding portion 56 provided such that at least a portion of the third electrode layer 55 is exposed to the outside. The corresponding portion 56 may be a portion where the third electrode layer 55 is exposed in the third electrode 50. The corresponding portion 56 may be a portion where charging action occurs with the discharge portion 46.

An empty space may be formed between the second electrode 40 and the third electrode 50. An empty space may be formed between the discharge portion 46 and the corresponding portion 56. An empty space may be formed between the discharge portion 46 and the corresponding portion 56 so that a charging action occurs.

The discharge portion 46 and the corresponding portion 56 may be disposed to face each other.

The discharge portion 46 may be provided such that an area thereof becomes smaller as the discharge portion is closer to the corresponding portion 56. The discharge portion 46 may be formed to have a shape protruding toward the corresponding portion 56.

The discharge portion 46 may be formed sharply. The discharge portion 46 may be cut to have a saw-toothed shape. The discharge portion 46 may have a triangular shape 48 with a vertex 47 being the point closest to the corresponding portion 56. The discharge portion 46 may include the vertex 47 protruding toward the corresponding portion 56.

The vertex 47 may be a region in which ion emission is concentrated in the discharge portion 46. Ions may be released more easily through the vertex 47.

The corresponding portion 56 may be provided in a straight shape. The corresponding portion 56 may be cut in a straight line along a third direction (C→C'). The corresponding portion 56 may extend in a straight line along the third direction (C→C').

As the corresponding portion 56 extends in a straight line, the charging action between the discharge portion 46 and the corresponding portion 56 may efficiently occur. That is, while the discharge portion 46 from which ions are released includes a sharp vertex 47, the corresponding portion 56 may induce corona discharge to occur more effectively in the discharge portion 46 by being formed to have a larger area than the discharge portion 46.

Referring to FIG. 4, the dust collection sheet 10 may be configured to be bent. As the flat dust collection sheet 10 composed of one sheet is bent in a zigzag manner, a first electrode 30, the second electrode 40, and the third electrode 50 may be arranged vertically (see FIG. 2).

The dust collection sheet 10 may be bent such that the second electrode 40 and the third electrode 50 are disposed on the same plane.

The second electrode 40 and the third electrode 50 may be disposed on the same plane. The first electrode 30 may be disposed on a different plane from the second electrode 40 and/or the third electrode 50. The first electrode 30 may be disposed in a zigzag manner with the second electrode 40 and/or the third electrode 50.

Figure 5:
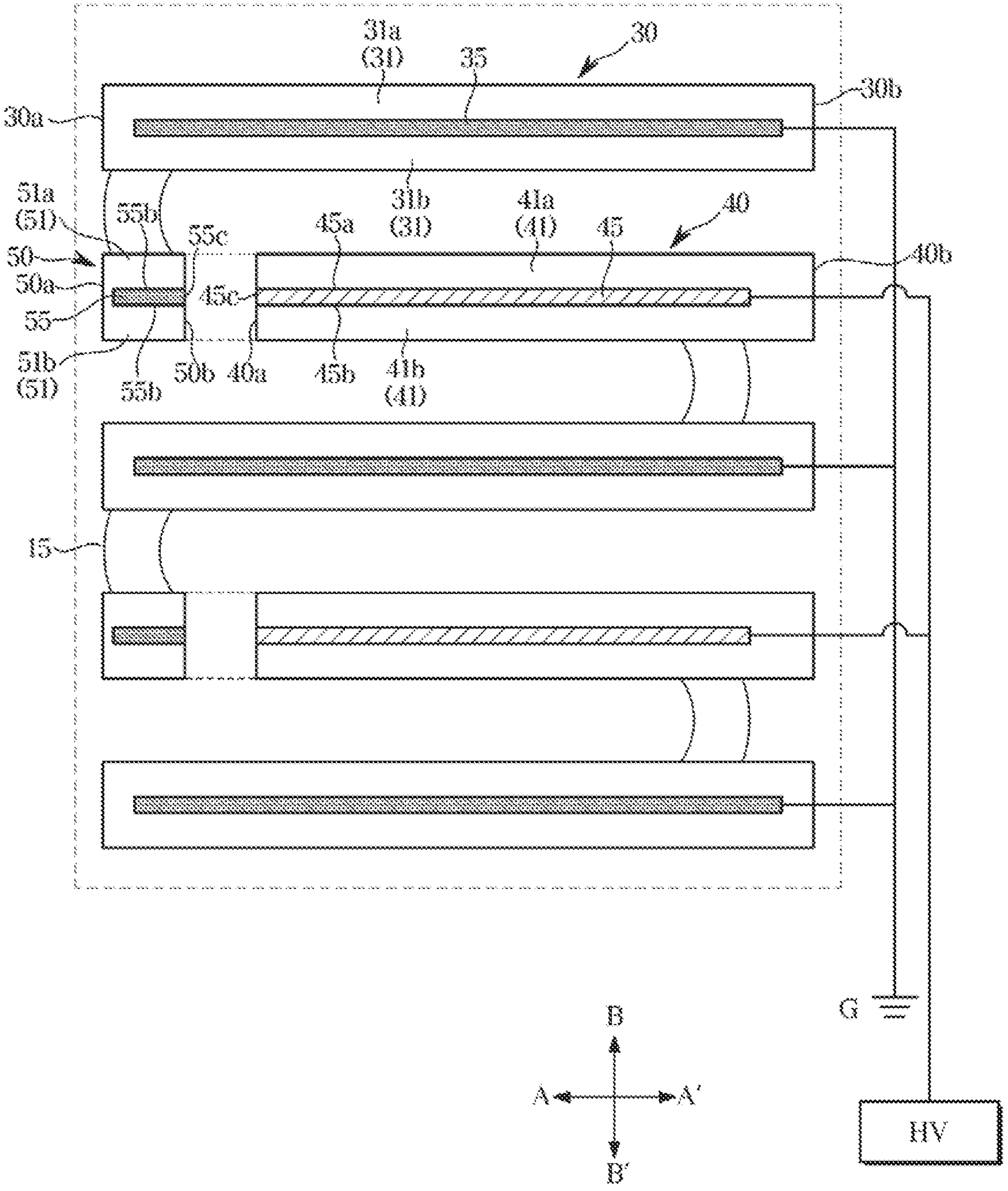
FIG. 5 is a side cross-sectional view of the dust collection sheet according to an embodiment.

FIG. 5 is a side cross-sectional view of the dust collection sheet. Specifically, FIG. 5 is a side cross-sectional view illustrating the dust collection sheet of FIG. 4 with respect to a reference line A.

The dust collection sheet 10 may include a plurality of the electrodes 30, 40, and 50, and the plurality of electrodes 30, 40, and 50 may extend along the first direction (A→A'). That is, as air flows in the first direction (A→A'), the air may pass between the plurality of electrodes 30, 40, and 50 extending in the first direction (A→A').

The dust collection sheet 10 may include the first electrode 30. The first electrode 30 may include the first dielectric layer 31 and the first electrode layer 35. The first electrode layer 35 may be provided inside the first dielectric layer 31.

The first dielectric layer 31 may include a first upper dielectric layer **31*a* disposed at an upper portion with respect to the first electrode layer 35 and a first lower dielectric layer 31*b* disposed at a lower portion with respect to the first electrode layer 35. The first dielectric layer 31 may be formed by bonding the first upper dielectric layer 31*a* and the first lower dielectric layer 31*b*. The first dielectric layer 31** may also be formed integrally without being divided into upper and lower portions.

The dust collection sheet 10 may include the second electrode 40. The second electrode 40 may include the second dielectric layer 41 and the second electrode layer 45. The second electrode layer 45 may be provided inside the second dielectric layer 41.

The second dielectric layer 41 may include a second upper dielectric layer **41*a* disposed at an upper portion with respect to the second electrode layer 45 and a second lower dielectric layer 41*b* disposed at a lower portion with respect to the second electrode layer 45. The second dielectric layer 41 may be formed by bonding the second upper dielectric layer 41*a* and the second lower dielectric layer 41*b*. The second dielectric layer 41** may also be formed integrally without being divided into upper and lower portions.

The second electrode layer 45 may include an upper surface **45*a* of the second electrode layer and a lower surface 45*b* of the second electrode layer with respect to the second direction (B→B'). The upper surface 45*a* of the second electrode layer may be disposed on the second upper dielectric layer 41*a*, and the lower surface 45*b* of the second electrode layer may be disposed on the second lower dielectric layer 41*b***.

The upper surface **45*a* of the second electrode layer and/or the lower surface 45*b* of the second electrode layer may be covered by the second dielectric layer 41. The upper surface 45*a* of the second electrode layer and/or the lower surface 45*b* of the second electrode layer may be disposed inside the second dielectric layer 41**.

The dust collection sheet 10 may include the third electrode 50. The third electrode 50 may include the third dielectric layer 51 and the third electrode layer 55. The third electrode layer 55 may be provided inside the third dielectric layer 51.

The third dielectric layer 51 may include a third upper dielectric layer **51*a* disposed at an upper portion with respect to the third electrode layer 55 and a third lower dielectric layer 51*b* disposed at a lower portion with respect to the third electrode layer 55. The third dielectric layer 51 may be formed by bonding the third upper dielectric layer 51*a* and the third lower dielectric layer 51***b*. The third dielectric layer 51 may also be formed integrally without being divided into upper and lower portions.

The third electrode layer 55 may include an upper surface 55*a* of the third electrode layer and a lower surface 55*b* of the third electrode layer with respect to the second direction (B→B'). The upper surface 55*a* of the third electrode layer may be disposed on the third upper dielectric layer 51*a*, and the lower surface 55*b* of the third electrode layer may be disposed on the third lower dielectric layer 51*b*.

The upper surface 55*a* of the third electrode layer and/or the lower surface 55*b* of the third electrode layer may be covered by the third dielectric layer 51. The upper surface 55*a* of the third electrode layer and/or the lower surface 55*b* of the third electrode layer may be disposed inside the third dielectric layer 51.

The third electrode 50 may be arranged parallel to the second electrode 40 with respect to the first direction (A→A'). The third electrode 50 may be disposed to be spaced apart from the second electrode 40 with respect to the first direction (A→A'). The second electrode 40 and the third electrode 50 may be disposed on the same plane.

As will be described later, one end 45*c* of the second electrode layer 45 and the other end 55*c* of the third electrode layer 55 may be open. That is, an empty space may be formed between the second electrode layer 45 and the third electrode layer 55 so that the charging action occur.

An empty space is formed between the second electrode layer 45 and the third electrode layer 55, but the second electrode 40 and the third electrode 50 may be maintained connected. Specifically, referring to FIG. 3, the second electrode 40 and the third electrode 50 may be connected by the first sheet 23 and/or the second sheet 24. The dotted line shown between the second electrode 40 and the third electrode 50 in FIG. 5 represents that the second electrode 40 and the third electrode 50 are connected to each other in portions other than the discharge portion 46 of the second electrode 40 and the corresponding portion 56 of the third electrode 50.

The first electrode 30 may be disposed to be spaced apart from the second electrode 40 and/or the third electrode 50 with respect to the second direction (B→B'). The first electrode 30 may be disposed on a different plane from the plane on which the second electrode 40 and the third electrode 50 are disposed.

The dust collection sheet 10 may include a bent portion 15. The bent portion 15 may be provided to connect the first electrode 30, the second electrode 40, and/or the third electrode 50. The first electrode 30, the second electrode 40, and/or the third electrode 50 may be disposed to face each other by the bent portion 15.

The bent portion 15 may have a bent shape such that a curved surface is formed between a plane on which the first electrode 30 is disposed and the plane on which the second electrode 40 and/or the third electrode 50 is disposed. The bent portion 15 may be formed in a zigzag pattern along a longitudinal direction of the dust collection sheet 10 between the plurality of first electrodes 30, the plurality of second electrodes 40 and/or the plurality of third electrodes 50.

A first voltage may be applied to the first electrode layer 35, a second voltage may be applied to the second electrode layer 45, and a third voltage may be applied to the third electrode layer 55.

The first voltage and the third voltage may be the same. The second voltage may be different from the first voltage and/or the third voltage.

The second voltage may be a higher voltage than the first voltage and/or the third voltage. The first voltage and/or the third voltage may be lower than the second voltage, or may be grounded which means a zero voltage.

Although the drawing illustrates as an example that the first electrode 30 and the third electrode 50 are grounded and a high voltage is applied to the second electrode 40, various circuits for applying potential differences to the first electrode 30, the second electrode 40, and the third electrode 50 may be included in the present disclosure.

When a voltage difference occurs between the first electrode 30 and the second electrode 40, the second electrode 40, which is a high voltage electrode, may be formed as a plus (+) electrode, and the first electrode 30, which is a low voltage electrode, may be formed as a minus (−) electrode. Herein, the plus (+) electrode and the minus (−) electrode may be expressed as the plus (+) electrode having a higher potential and the negative (−) electrode having a lower potential based on the potential difference between the two electrodes, respectively. An electric field may be formed between the first electrode 30 and the second electrode 40.

The first electrode 30 may include a first dust collection portion 39, and the second electrode 40 may include a second dust collection portion 49. The first dust collection portion 39 may form the minus (−) electrode, and the second dust collection portion 49 may form the plus (+) electrode. An electric field is formed between the first dust collection portion 39 and the second dust collection portion 49, so that charged aerosols may be collected in the first dust collection portion 39.

The second electrode 40 may include the discharge portion 46. The discharge portion 46 may be an open portion so that the second electrode layer 45 provided inside the second dielectric layer 41 is exposed to the outside. The discharge portion 46 may be provided such that at least a portion of the second electrode layer 45 is exposed.

The second electrode 40 may include the discharge portion 46 comprising a portion of the second electrode layer 45 that is not covered by the second dielectric layer 41. The second electrode 40 may include a discharge portion 46 provided such that at least a portion of the second electrode layer 45 is exposed to the outside.

The discharge portion 46 may comprise a portion of the second electrode layer 45 that is not covered by the second dielectric layer 41. The discharge portion 46 may comprise a portion of the second electrode layer 45 exposed to outside of the second dielectric layer 41 such that the third electrode layer 55 is exposed to outside to occur charging action. The discharge portion 46 may be a portion of the second electrode layer 45 that is not covered by the second dielectric layer 41.

Specifically, when an edge formed on one side of the second electrode 40 is cut, the second dielectric layer 41 is opened, so that a portion of the second electrode layer 45 may be exposed to the outside. That is, a portion of the second electrode layer 45 may not be covered by the second dielectric layer 41. The discharge portion 46 may be disposed on the side surface 45*c* of the second electrode layer 45. The side surface 45*c* of the second electrode layer 45 may be a portion connecting the upper surface 45*a* and lower surface 45*b* of the second electrode layer 45.

The open portion of the second electrode layer 45 may be the discharge surface 45*c*. The discharge surface 45*c* may be a side surface of the second electrode layer 45. The discharge surface 45*c* may be a portion releasing ions.

In this case, when a voltage is applied to the second electrode layer 45, the corona discharge may occur in the second electrode layer 45 exposed to the outside so that ions may be released toward the outside.

The third electrode 50 may include the corresponding portion 56. The corresponding portion 56 may be an open portion so that the third electrode layer 55 provided inside the third dielectric layer 51 is exposed to the outside. The corresponding portion 56 may be provided such that at least a portion of the third electrode layer 55 is exposed.

The third electrode 50 may include the corresponding portion 56 comprising a portion of the third electrode layer 55 that is not covered by the third dielectric layer 51. The third electrode 50 may include a corresponding portion 56 provided such that at least a portion of the third electrode layer 55 is exposed to the outside.

The corresponding portion 56 may include a portion of the third electrode layer 55 that is not covered by the third dielectric layer 51. The corresponding portion 56 may be a portion of the third electrode layer 55 that is not covered by the third dielectric layer 51.

Specifically, when an edge formed on one side of the third electrode 50 is cut, the third dielectric layer 51 is opened, so that a portion of the third electrode layer 55 may be exposed to the outside. That is, a portion of the third electrode layer 55 may not be covered by the third dielectric layer 51. The corresponding portion 56 may be disposed on the side surface 55*c* of the third electrode layer 55. The side surface 55*c* of the third electrode layer 55 may be a portion connecting the upper surface 55*a* and lower surface 55*b* of the third electrode layer 55.

The open portion of the third electrode layer 55 may be the corresponding surface 55*c*. The corresponding surface 55*c* may be a side surface of the third electrode layer 55.

In this case, because the third electrode layer 55 is applied with a lower voltage than the second electrode layer 45 or is grounded, an electric field may be formed between the third electrode layer 55 and the second electrode layer 45. The corresponding surface 55*c* may be provided to form an electric field with the discharge surface 45*c*.

Ions released from the discharge portion 46 may move toward the corresponding portion 56. Aerosols in the air existing between the discharge portion 46 and the corresponding portion 56 may be charged by the ions. The charged aerosols may be collected in the first dust collection portion 39 and/or the second dust collection portion 49.

The discharge portion 46 and the corresponding portion 56 may be arranged to face each other. The discharge portion 46 and the corresponding portion 56 may face each other in the first direction (A→A'). The discharge portion 46 and the corresponding portion 56 may be arranged in a straight line with respect to the first direction (A→A').

The discharge surface 45*c* and the corresponding surface 55*c* may be arranged in parallel. The discharge surface 45*c* and the corresponding surface 55*c* may be arranged side by side in a straight line. The discharge surface 45*c* and the corresponding surface 55*c* may be disposed to face each other.

The number of the third electrodes 50 may be provided to be equal to the number of the second electrodes 40. The number of the corresponding portions 56 may be provided to be equal to the number of the discharge portions 46. The number of the corresponding surfaces 55*c* may be provided to be equal to the number of the discharge surfaces 45*c*.

The ions released from the discharge portion 46 may charge aerosols in the air while moving toward the corresponding portion 56.

Because the corresponding portion 56 is disposed to face the discharge portion 46, the corona discharge may occur more effectively. Because the corresponding portion 56 and the discharge portion 46 are arranged in a straight line, the charging action may occur effectively. A strong electric field may be formed between the corresponding portion 56 and the discharge portion 46.

The dust collection sheet 10 may include the dust collection portions 39 and 49. The dust collection portions 39 and 49 may include the first dust collection portion 39 provided on the first electrode 30 and the second dust collection portion 49 provided on the second electrode 40.

The second dust collection portion 49 may extend from the discharge portion 46. The second dust collection portion 49 may be disposed further downstream of the air flow path than the discharge portion 46. The discharge portion 46 and the second dust collection portion 49 may be arranged along the first direction (A→A'). The discharge portion 46 and the second dust collection portion 49 may be formed integrally.

Figure 6:
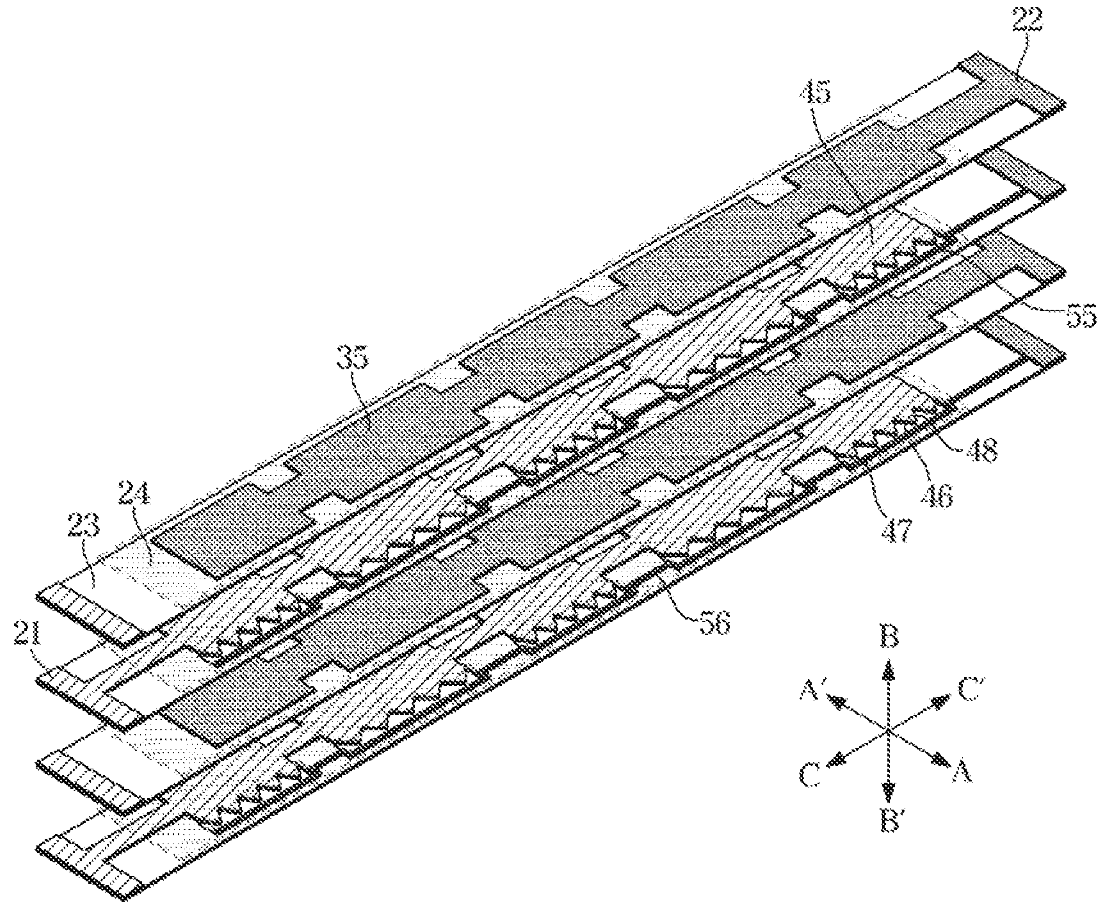
FIG. 6 is a perspective view illustrating the dust collection sheets to be stacked according to an embodiment.
Figure 7:
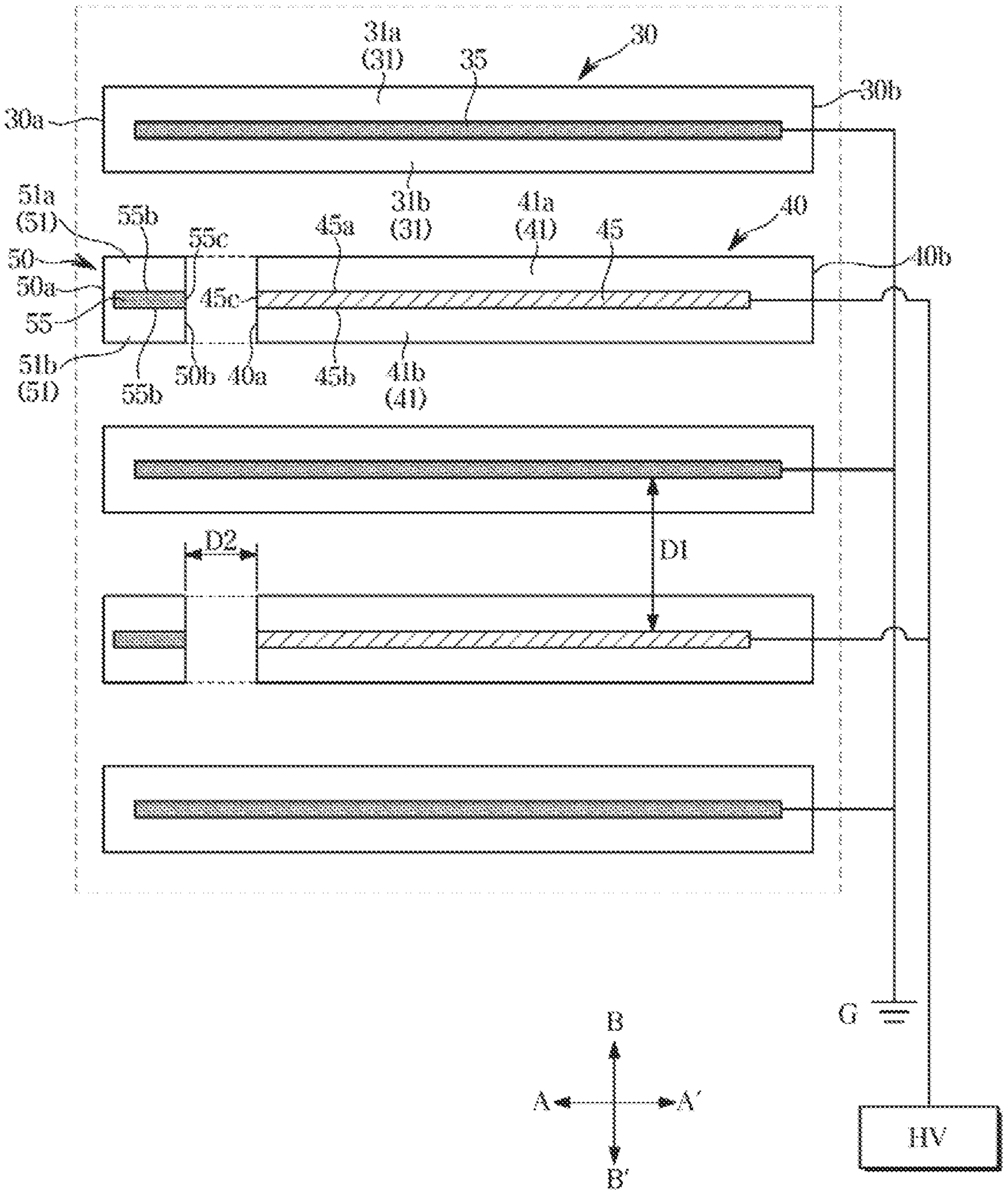
FIG. 7 is a side cross-sectional view of the dust collection sheet according to an embodiment.

FIG. 6 is a perspective view illustrating that the dust collection sheets to be stacked. FIG. 7 is a side cross-sectional view of the dust collection sheet.

The dust collection sheet 10 may be composed of individual sheets. For example, the first electrode 30 may be provided on one sheet, and the second electrode 40 and the third electrode 50 may be provided together on another sheet. A sheet provided with the first electrode 30 and a sheet provided with the second electrode 40 and/or the third electrode 50 may be alternately stacked.

As a sheet on which the first electrode 30 is formed and a sheet on which the second electrode 40 and/or the third electrode 50 is formed are provided individually, a length of each sheet may be freely adjusted. Therefore, the length of each sheet may be adjusted depending on a size, shape, and arrangement of the electrostatic precipitator 1 and a voltage applied to the electrode layers 35, 45, and 55. In addition, as the sheets are provided individually, the first electrode 30 and/or the second electrode 40 and/or the third electrode 50 may be arranged more freely.

Referring to FIG. 7, as the dust collection sheet 10 is provided such that individual sheets are stacked, the bent portion may be omitted. However, the present disclosure is not limited thereto.

Even in a case in which the dust collection sheet 10 is configured as individual sheets, the charging action between the discharge portion 46 and the corresponding portion 56 may be the same as that described above. Therefore, redundant description thereof will be omitted.

A distance D1 between the first electrode layer 35 and the second electrode layer 45 may be provided to be longer than a distance D2 between the second electrode layer 45 and the third electrode layer 55. The distance D1 between the first electrode layer 35 and the second electrode layer 45 with respect to the second direction (B↔B') may be provided to be longer than the distance D2 between the side surface 45*c* of the second electrode layer 45 and the side surface 55*c* of the third electrode layer 55 with respect to the first direction (A↔A'). This may be the same as in FIG. 5 including the configuration of the bent portion 15.

However, the present disclosure is not limited thereto. D1 may be provided to be shorter than or equal to D2.

Figure 8:
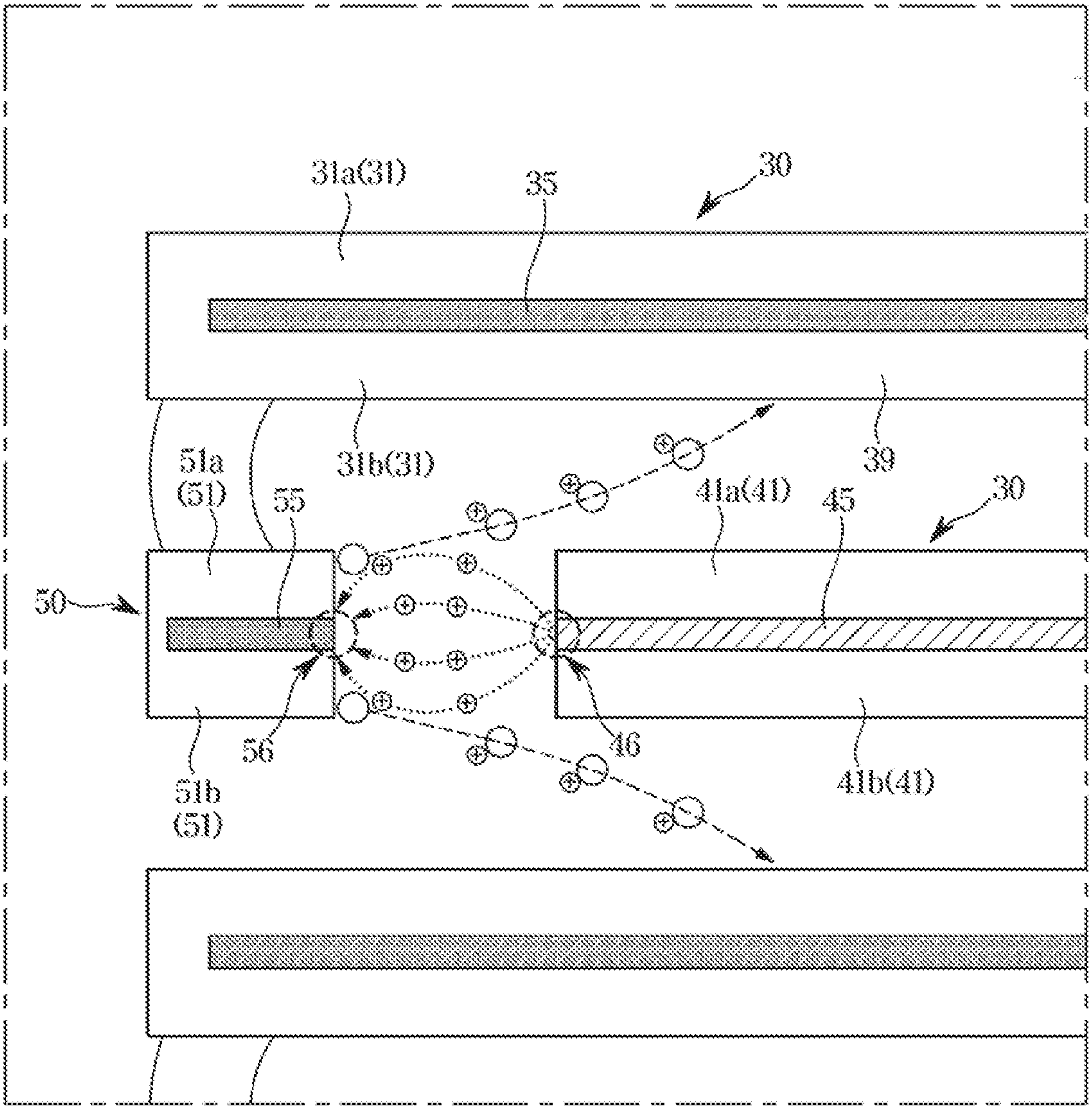
FIG. 8 is a side cross-sectional view illustrating a process in which aerosols are charged and collected in the dust collection sheet when a second electrode layer releases positive ions according to an embodiment.
Figure 9:
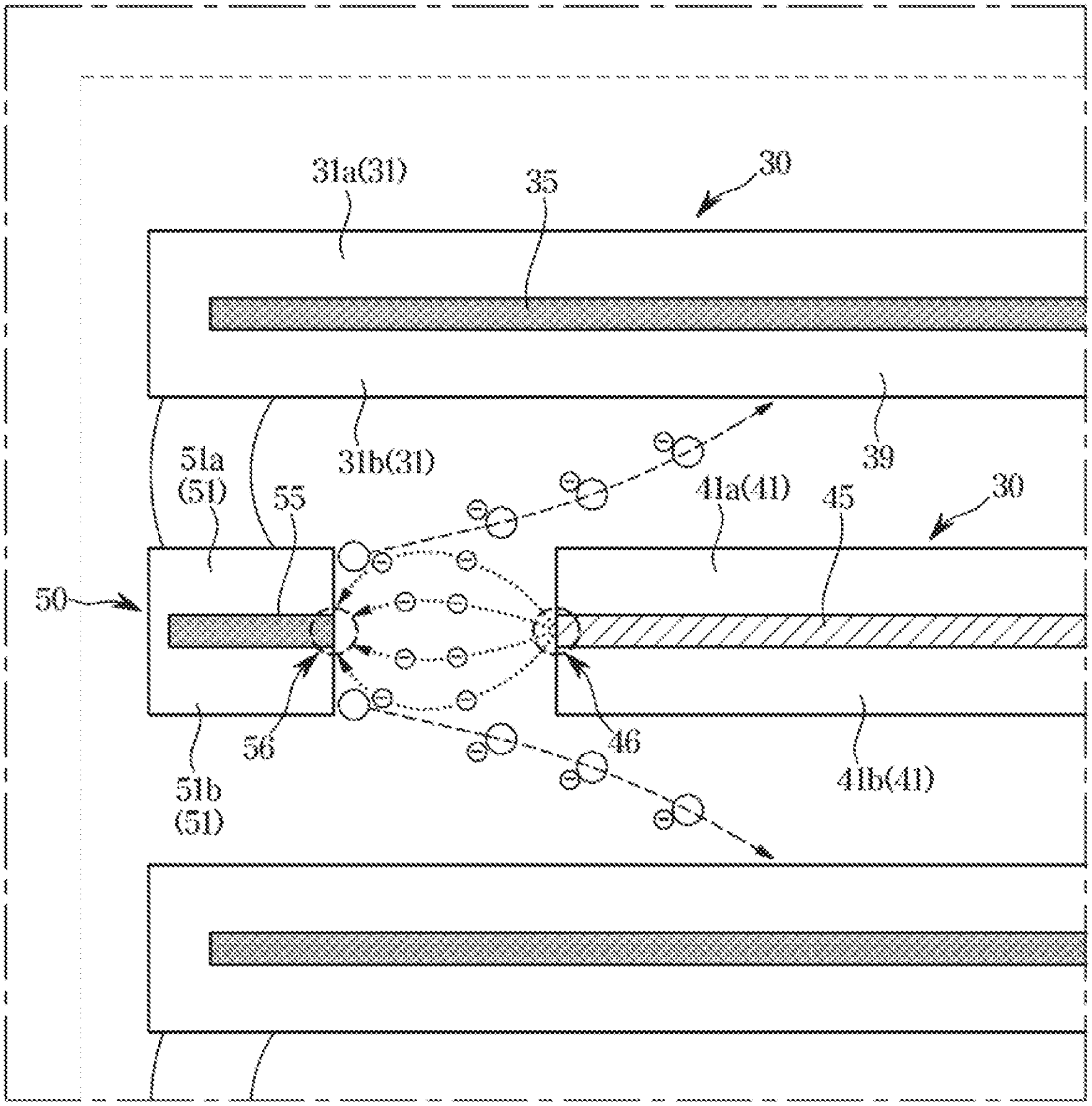
FIG. 9 is a side cross-sectional view illustrating a process in which aerosols are charged and collected in the dust collection sheet when the second electrode layer releases negative ions according to an embodiment.

FIG. 8 is a side cross-sectional view illustrating a process in which aerosols are charged and collected in the dust collection sheet when a second electrode layer releases positive ions. FIG. 9 is a side cross-sectional view illustrating a process in which aerosols are charged and collected in the dust collection sheet when the second electrode layer releases negative ions.

Referring to FIG. 8, as a high voltage of plus (+) polarity is applied to the second electrode 40, the discharge portion 46 may release positive ions. That is, aerosols in the air may be charged with a plus (+) pole through the corona discharge between the discharge portion 46 and the corresponding portion 56.

The charged aerosols may move to the dust collection sheet 10 disposed downstream along a direction of the air flow. Specifically, the aerosols charged with the plus (+) pole may be collected in the first dust collection portion 39 of the first electrode 30 of a minus (–) pole. Therefore, the air passed through the dust collection sheet 10 may be discharged in a clean state with aerosols removed.

At this time, because the corresponding portion 56 is disposed further upstream of the air flow path than the discharge portion 46, the ions released by the discharge portion 46 move in a direction opposite to the direction of the air flow. That is, the ions move against the direction of air flow and charge aerosols.

Charging performance may be lowered when the charged aerosols are collected in the corresponding portion 56, but in the present disclosure, because the corresponding portion 56 is disposed further upstream than the discharge portion 46, the charged aerosols may be prevented from being collected in the corresponding portion 56. This is because the charged aerosols must move against the direction of air flow in order to move toward the corresponding portion 56. Therefore, the charging performance and efficiency of the dust collection sheet 10 may be improved.

Referring to FIG. 9, as a high voltage of minus (–) polarity is applied to the second electrode 40, the discharge portion 46 may release negative ions. That is, aerosols in the air may be charged with the minus (–) pole through the corona discharge between the discharge electrodes 30, 40 and 50 and the corresponding electrodes 30, 40 and 50.

The aerosols charged with the minus (–) pole may be collected in the first dust collection portion 39 of the first electrode 30 of the plus (+) pole. Hereinafter, descriptions overlapping with FIG. 8 will be omitted.

FIGS. 8 and 9 illustrate as an example that the dust collection sheet is bent and stacked, but the present disclosure is not limited thereto. That is, even in the case in which the dust collection sheets are individually provided and stacked as illustrated in FIGS. 5 and 6, the process in which the second electrode layer releases ions to charge aerosols and the aerosols are collected on the dust collection sheets is the same.

Figure 10:
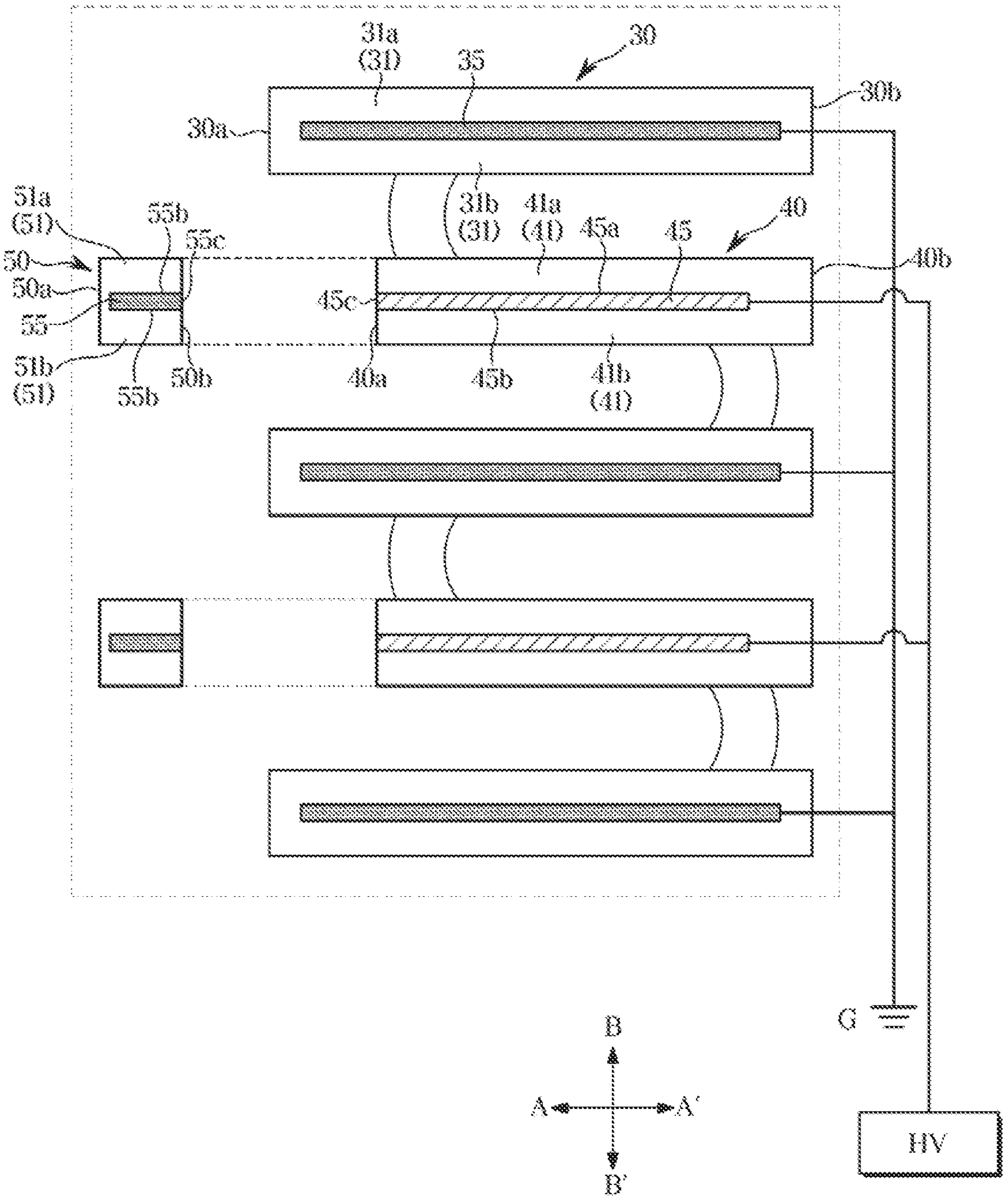
FIG. 10 is a side cross-sectional view of the dust collection sheet according to an embodiment.
Figure 11:
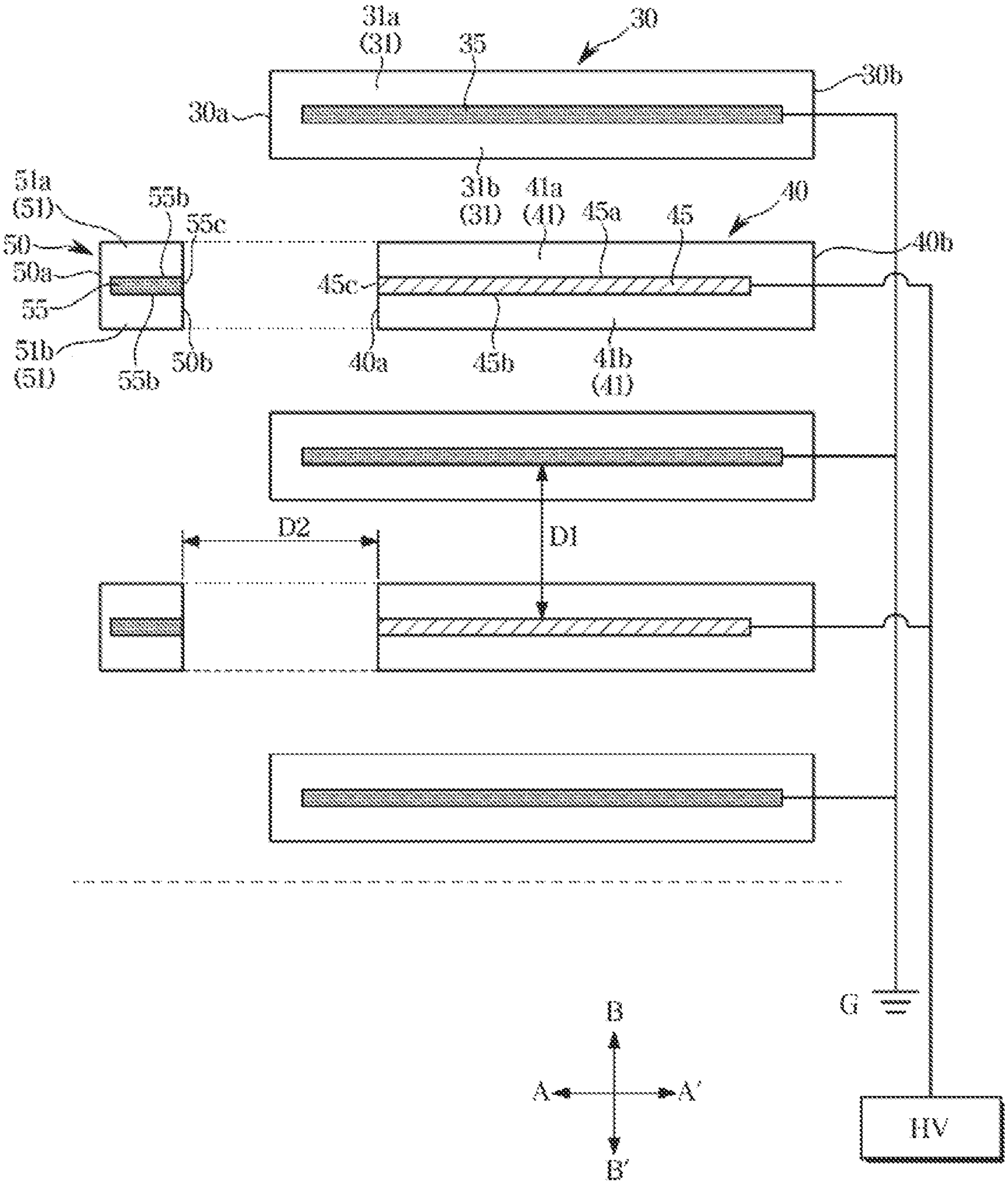
FIG. 11 is a side cross-sectional view of the dust collection sheet according to an embodiment.

FIG. 10 is a side cross-sectional view of the dust collection sheet. FIG. 11 is a side cross-sectional view of the dust collection sheet.

The third electrode 50 may be disposed to be spaced apart from the first electrode 30 and/or the second electrode 40 with respect to the first direction (A→A'). The third electrode 50 may be disposed further upstream than the first electrode 30 and/or the second electrode 40.

The first electrode 30 may include one end (i.e., a first end) 30*a* of the first electrode disposed upstream and other end (i.e., a second end) 30*b* of the first electrode disposed downstream.

The third electrode 50 may include one end (i.e., a first end) 50*a* of the third electrode disposed upstream and other end (i.e., a second end) 50*b* of the third electrode disposed downstream. The second electrode 40 may include one end 40*a* of the second electrode disposed upstream and other end 40*b* of the second electrode disposed downstream. The other end 50*b* of the third electrode and the one end 40*a* of the second electrode may be disposed to face each other.

With respect to the first direction, a length from the one end 50*a* of the third electrode to the other end 40*b* of the second electrode may be provided to be longer than a length from the one end 50*a* of the first electrode to the other end 50*b* of the first electrode.

As a separation space between the other end 50*b* of the third electrode and the one end 40*a* of the second electrode is formed to be large, a distance between the discharge portion 46 and the corresponding portion 56 may become long. Accordingly, a wide electrification space is formed such that aerosols in a wider area may be charged.

Although FIG. 10 illustrates the method of bending the dust collection sheet 10 as an example, the present disclosure is not limited thereto.

For example, referring to FIG. 11, the dust collection sheet 10 may be manufactured by the method of bending a single sheet or by the method of stacking individual sheets.

On the other hand, the distance D1 between the first electrode layer 35 and the second electrode layer 45 may be provided to be shorter than the distance D2 between the second electrode layer 45 and the third electrode layer 55. The distance D1 between the first electrode layer 35 and the second electrode layer 45 with respect to the second direction (B↔B') may be provided to be shorter than the distance D2 between the side surface 45*c* of the second electrode layer 45 and the side surface 55*c* of the third electrode layer 55 with respect to the first direction (A↔A'). This may be the same as in FIG. 10 including the configuration of the bent portion 15.

Figure 12:
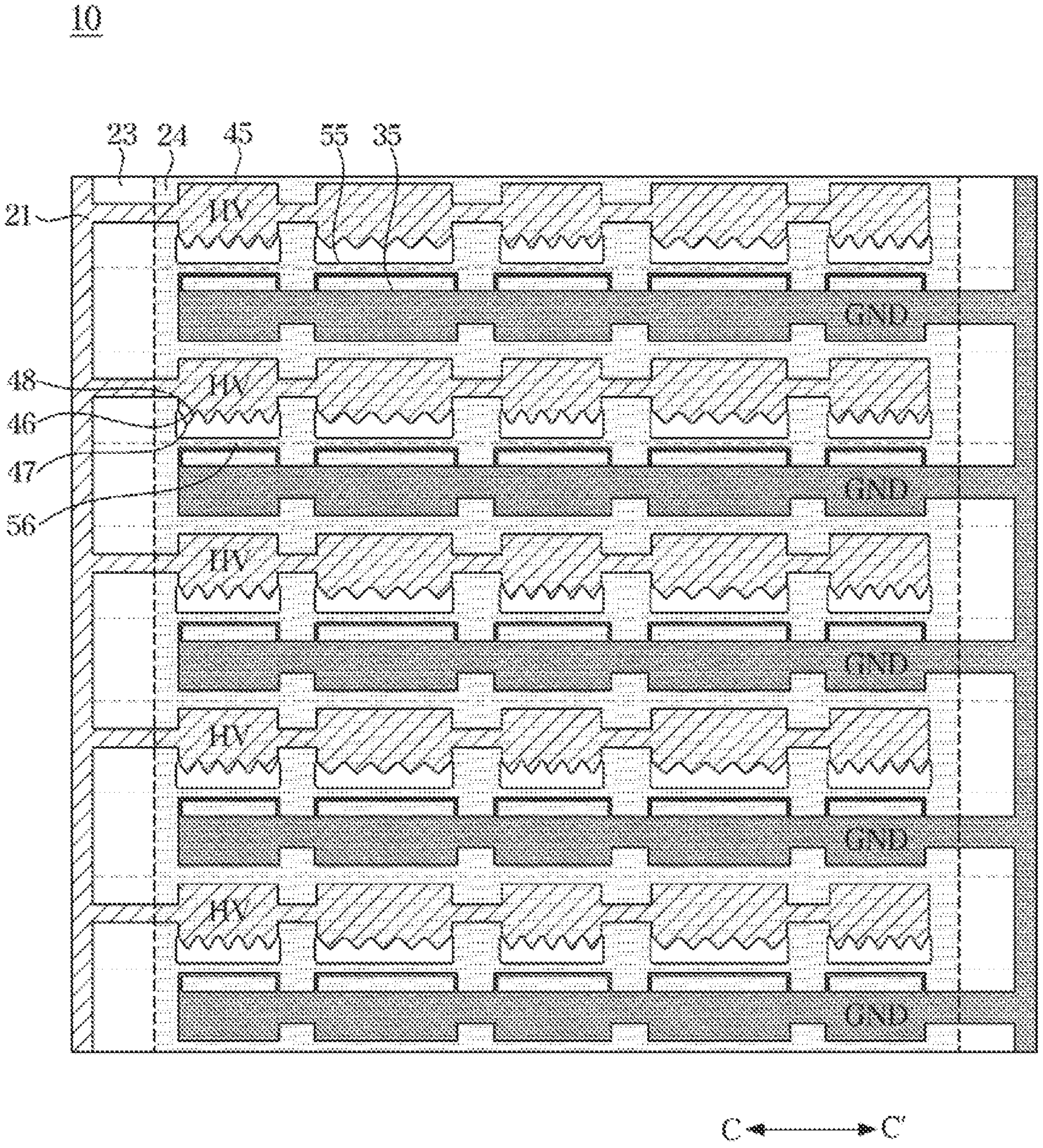
FIG. 12 is a plan view illustrating an unfolded view of the dust collection sheet according to an embodiment.
Figure 13:
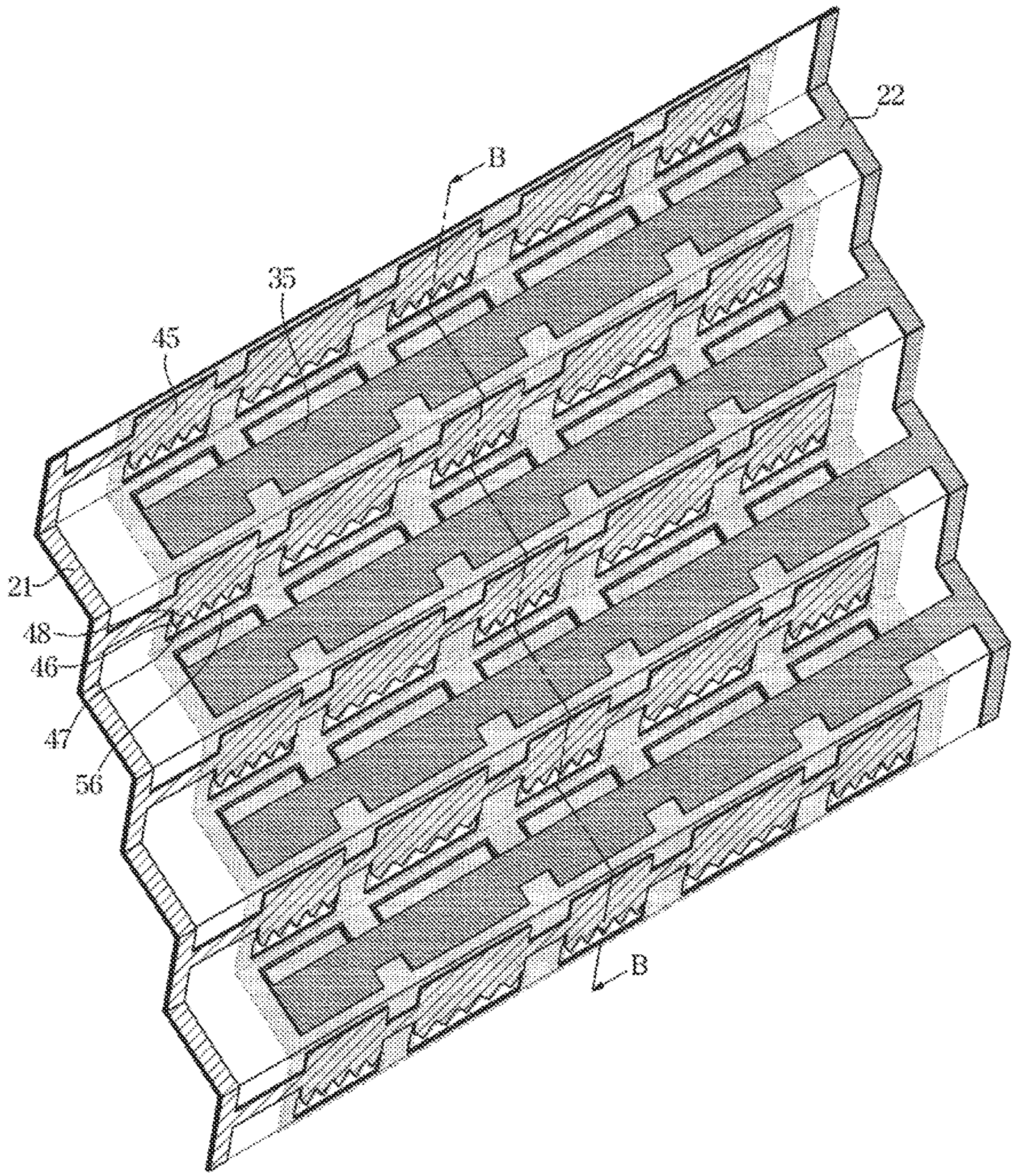
FIG. 13 is a perspective view illustrating a process of folding the dust collection sheet of FIG. 12 according to an embodiment.
Figure 14:
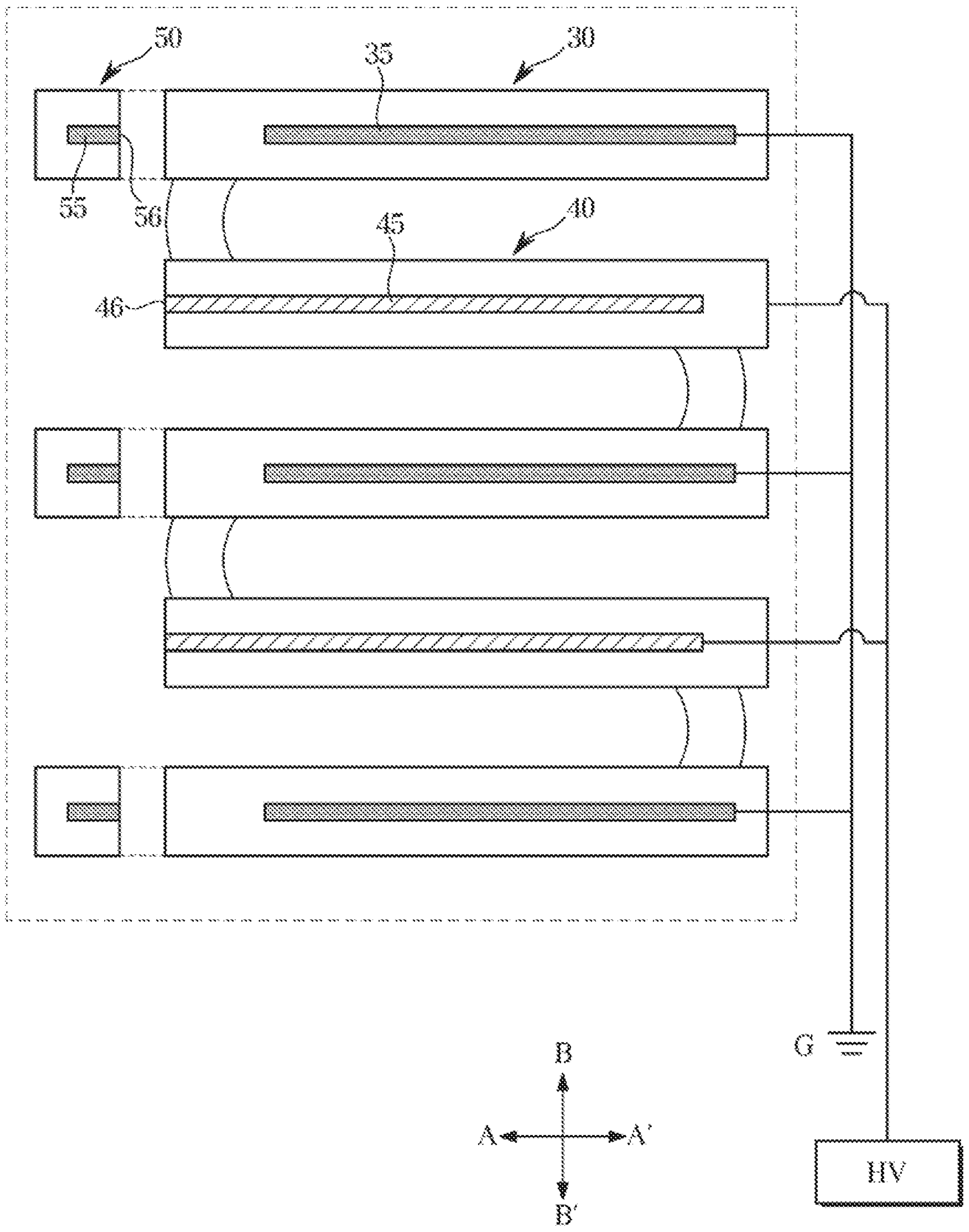
FIG. 14 is a side cross-sectional view of the dust collection sheet according to an embodiment.
Figure 15:
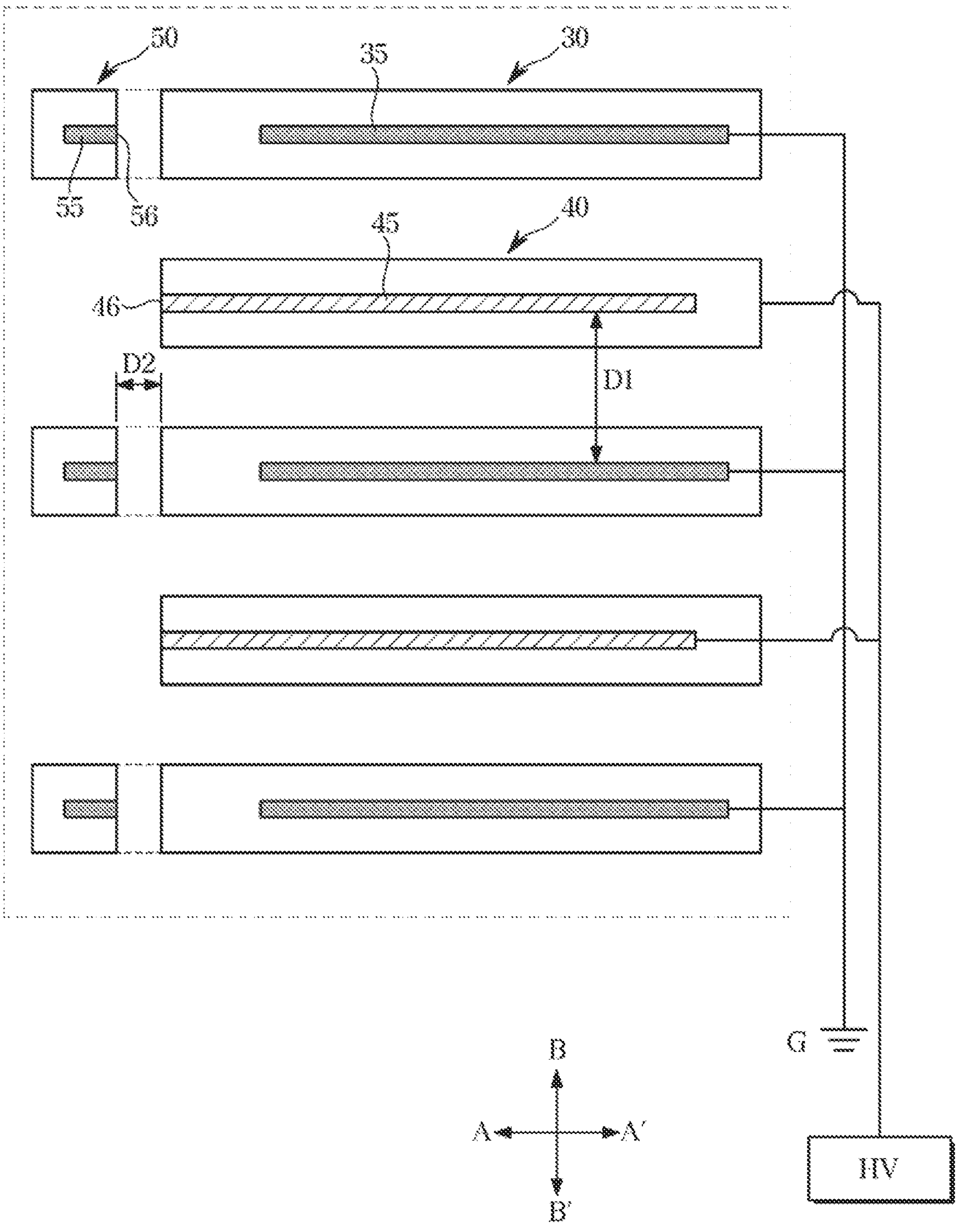
FIG. 15 is a side cross-sectional view of the dust collection sheet according to an embodiment.
Figure 16:
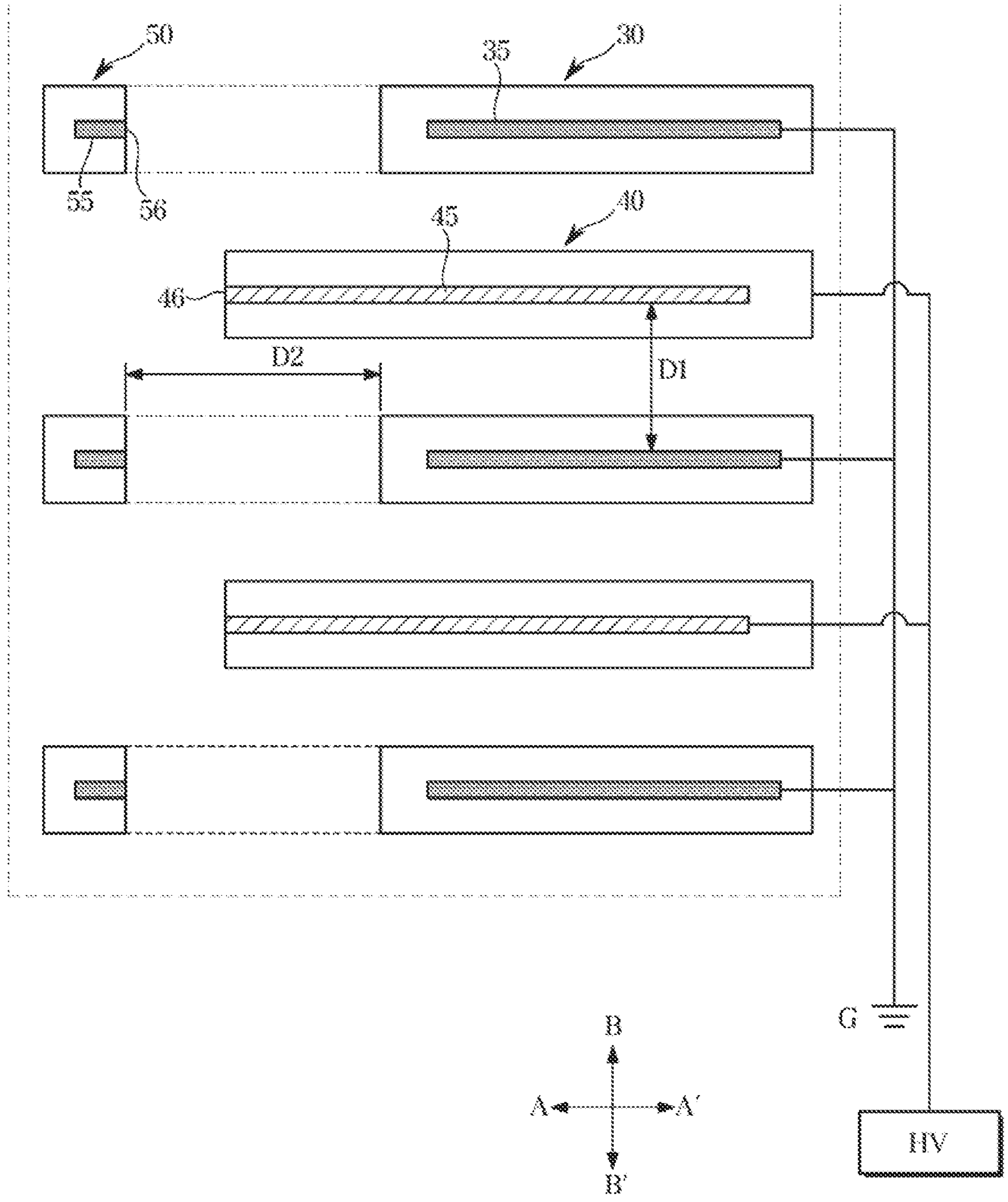
FIG. 16 is a side cross-sectional view of the dust collection sheet according to an embodiment.

However, the present disclosure is not limited thereto. D1 may be provided to be longer than or equal to D2. FIG. 12 is a plan view illustrating an unfolded view of the dust collection sheet. FIG. 13 is a perspective view illustrating a process of folding the dust collection sheet of FIG. 12. FIG. 14 is a side cross-sectional view of the dust collection sheet. FIG. 15 is a side cross-sectional view of the dust collection sheet. FIG. 16 is a side cross-sectional view of the dust collection sheet.

Referring to FIGS. 12 and 13, the dust collection sheet 10 may be bent such that the first electrode 30 and the third electrode 50 are disposed on the same plane.

The first electrode 30 and the third electrode 50 may be disposed on the same plane. The second electrode 40 may be disposed on a different plane from the first electrode 30 and/or the third electrode 50. The second electrode 40 may be disposed in a zigzag manner with the first electrode 30 and/or the third electrode 50.

The dust collection sheet 10 may be composed of individual sheets. For example, the second electrode 40 may be provided on one sheet, and the first electrode 30 and the third electrode 50 may be provided together on another sheet. A sheet provided with the second electrode 40 and a sheet provided with the first electrode 30 and/or the third electrode 50 may be alternately stacked.

Referring to FIG. 14, the third electrode 50 may be arranged parallel to the first electrode 30 with respect to the first direction (A→A'). The third electrode 50 may be disposed to be spaced apart from the first electrode 30 with respect to the first direction (A→A').

The third electrode 50 may be disposed to be spaced apart from the second electrode 40 with respect to the second direction (B→B').

The corresponding portion 56 may be disposed to be spaced apart from the discharge portion 46 with respect to the second direction (B→B'). The corresponding surface 55*c* may be disposed to be spaced apart from the discharge surface 45*c* with respect to the second direction (B-+B').

The corresponding portion 56 may be disposed above and/or below the discharge portion 46. The corresponding portion 56 may be disposed in a diagonal direction of the discharge portion 46.

The ions released from the discharge portion 46 may move toward the corresponding portion 56. At this time, because the corresponding portion 56 is disposed to be spaced apart from the discharge portion 46 with respect to the second direction (B→B'), the ions may move toward the second direction (B→B'). Therefore, the ions may diffuse into a wider space.

That is, the ions released by the discharge portion 46 may charge aerosols in the air over a wider area while moving above and/or below the discharge portion 46. In addition, because the discharge portion 46 and the corresponding portion 56 are spaced apart from each other, spark generation may be prevented.

Although FIG. 14 illustrates the method of bending the dust collection sheet 10 as an example, the present disclosure is not limited thereto.

For example, referring to FIGS. 15 and 16, the dust collection sheet 10 may be manufactured by the method of bending a single sheet or by the method of stacking individual sheets.

On the other hand, referring to FIG. 15, the distance D1 between the first electrode layer 35 and the second electrode layer 45 may be provided to be longer than the distance D2 between the second electrode 40 and the third electrode 50. The distance D1 between the first electrode layer 35 and the second electrode layer 45 with respect to the second direction (B↔B') may be provided to be longer than the distance D2 between the second electrode 40 and the third electrode 50 with respect to the first direction (A↔A'). This may be the same as in FIG. 14 including the configuration of the bent portion.

Figure 17:
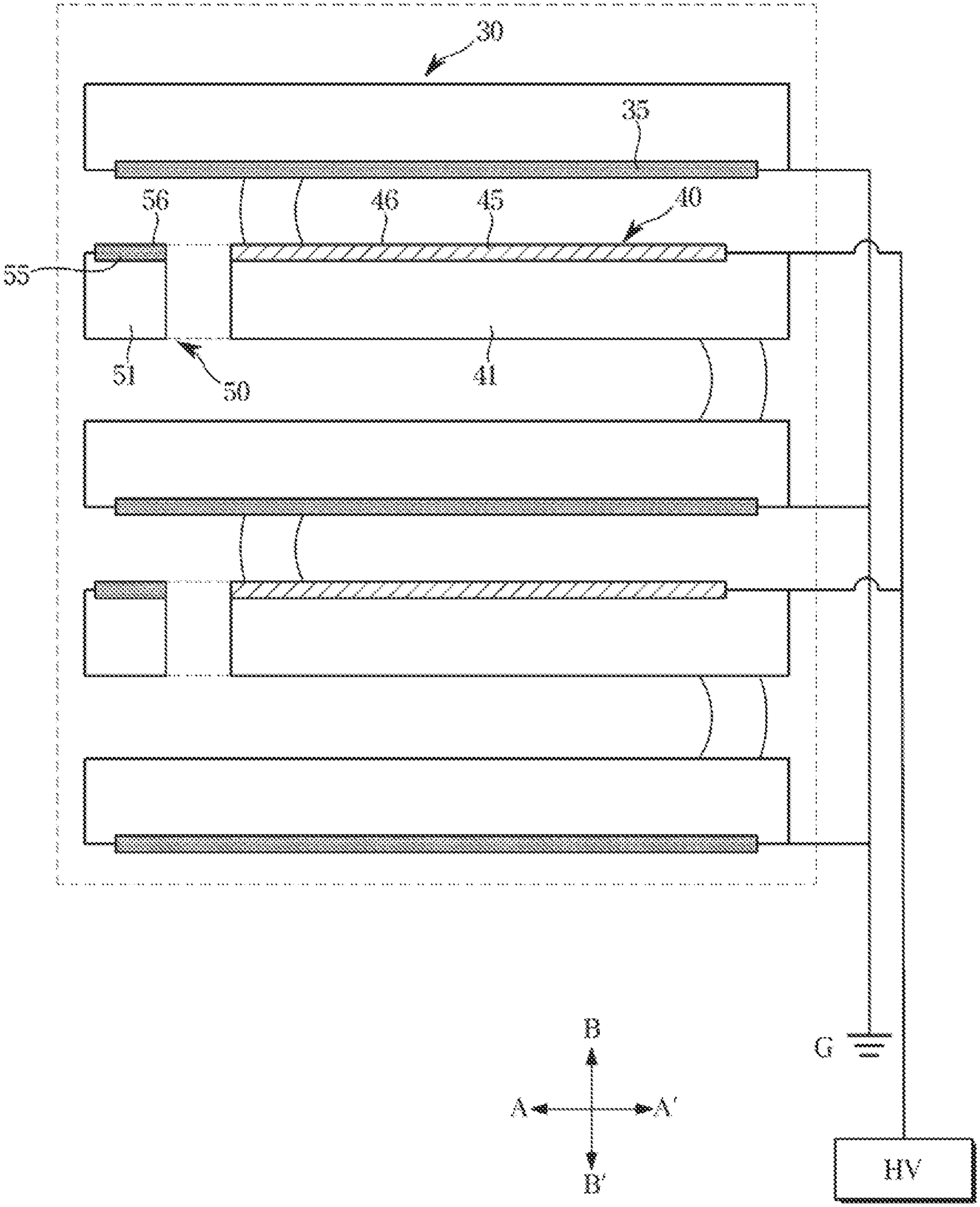
FIG. 17 is a side cross-sectional view of the dust collection sheet according to an embodiment.
Figure 18:
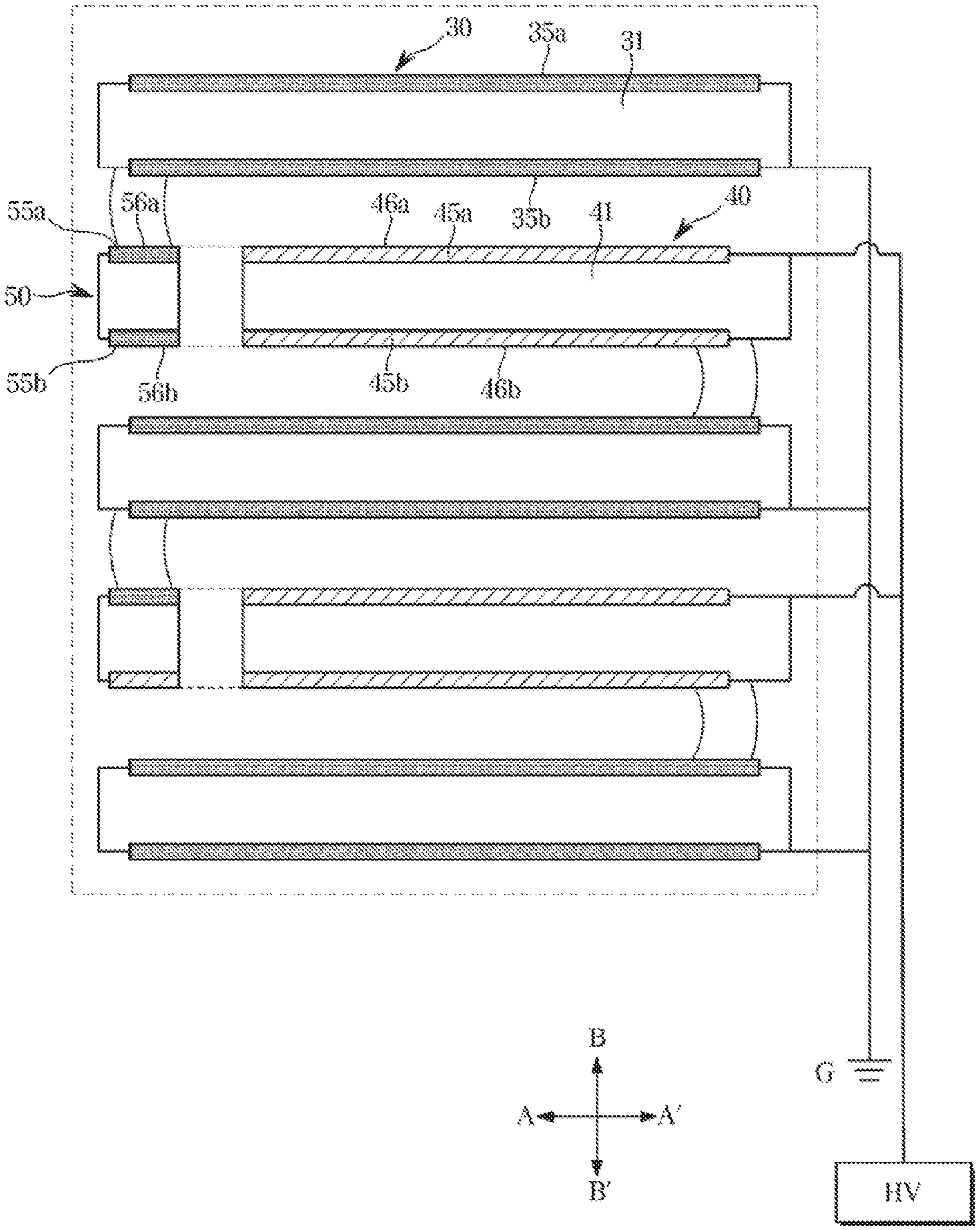
FIG. 18 is a side cross-sectional view of the dust collection sheet according to an embodiment.

However, the present disclosure is not limited thereto. For example, referring to FIG. 16, D1 may be provided to be shorter than D2. Or, D1 and D2 may be provided equally. FIG. 17 is a side cross-sectional view of the dust collection sheet. FIG. 18 is a side cross-sectional view of the dust collection sheet.

In addition to arranging the electrode layers 35, 45, and 55 inside the dielectric layers 31, 41, and 51, the dust collection sheet 10 may be disposed such that the electrode layers 35, 45, and 55 are exposed to the outside of the dielectric layers 31, 41, and 51.

For example, in addition to a three-layer form in which the electrode layer is disposed between the lower dielectric layer and the upper dielectric layer, the dielectric layer and the electrode layer may be manufactured in a two-layer form.

Referring to FIG. 17, the second electrode 40 may include the second dielectric layer 41 and the second electrode layer 45 disposed at an upper portion of the second dielectric layer 41. The second electrode layer 45 may be disposed such that the upper surface thereof is exposed to the outside. The discharge portion 46 may be the upper surface of the second electrode layer 45. The discharge portion 46 may extend along the first direction (A→A').

The third electrode 50 may include the third dielectric layer 51 and the third electrode layer 55 disposed at an upper portion of the third dielectric layer 51. The third electrode layer 55 may be disposed such that the upper surface thereof is exposed to the outside. The corresponding portion 56 may be the upper surface of the third electrode layer 55. The corresponding portion 56 may extend along the first direction (A→A').

As the area of the discharge portion 46 and/or the corresponding portion 56 increases, discharge currents and an amount of ions generated may increase.

Referring to FIG. 18, in addition to disposing the electrode layer between the lower dielectric layer and the upper dielectric layer, the dust collection sheet 10 may also be manufactured in the form of disposing the dielectric layer between the upper electrode layer and the lower electrode layer.

The first electrode 30 may include the first upper electrode layer 35*a*, the first lower electrode layer 35*b*, and the first dielectric layer 31 disposed therebetween.

The second electrode 40 may include the second upper electrode layer 45*a*, the second lower electrode layer 45*b*, and the second dielectric layer 41 disposed therebetween. An upper surface 46*a* of the second upper electrode layer 45*a* and a lower surface 46*b* of the second lower electrode layer 45*b* may be exposed to the outside. The discharge portion 46 may be formed on the upper surface 46*a* of the second upper electrode layer 45*a* and/or the lower surface 46*b* of the second lower electrode layer 45*b*.

The third electrode 50 may include the third upper electrode layer 55*a*, the third lower electrode layer 55*b*, and the third dielectric layer 51 disposed therebetween. An upper surface 56*a* of the third upper electrode layer 55*a* and a lower surface 56*b* of the third lower electrode layer 55*b* may be exposed to the outside. The corresponding portion 56 may be formed on the upper surface 56*a* of the third upper electrode layer 55*a* and/or the lower surface 56*b* of the third lower electrode layer 55*b*.

As the area of the discharge portion 46 and/or the corresponding portion 56 increases, discharge currents and the amount of ions generated may increase.

The dust collection sheet 10 according to an embodiment of the present disclosure may include the first electrode 30 extending along the first direction (A→A') from the upper stream toward the lower stream of the air flow path, and including the first electrode layer 35 to which the first voltage is applied and the first dielectric layer 31 covering the first electrode layer 35; the second electrode 40 disposed in the second direction (B→B') orthogonal to the first electrode 30 with respect to the first direction (A→A'), and including the second electrode layer 45 to which the second voltage different from the first voltage is applied and the second dielectric layer 41 covering the second electrode layer 45; and the third electrode 50 disposed parallel to the second electrode 40 in the first direction (A→A'), and including the third electrode layer 55 to which the third voltage different from the second voltage is applied and the third dielectric layer 51 covering the third electrode layer 55, wherein the second electrode 40 may include the discharge portion 46 provided such that the second electrode layer 45 is exposed to the outside of the second dielectric layer 41, and the third electrode 50 may include the corresponding portion 56 provided such that the third electrode layer 55 is exposed to the outside to occur charging action with the discharge portion 46 and disposed to face the discharge portion 46 in the first direction (A→A'). According to the present disclosure, the dust collection sheet 10 may simultaneously perform the functions of charging and collecting aerosols in the air. Therefore, manufacturing costs may be reduced and space utilization may be increased. In addition, because the corresponding portion 56 and the discharge portion 46 are disposed to face each other, the corona discharge may occur more effectively so that charging of aerosols may be facilitated.

The discharge portion 46 and the corresponding portion 56 may be arranged in a straight line with respect to the first direction (A→A') in which the second electrode 40 and the third electrode 50 extend. According to the present disclosure, because the discharge portion 46 and the corresponding portion 56 are arranged in a straight line with respect to the first direction (A↔A'), the electric field between the discharge portion 46 and the corresponding portion 56 is formed strong so that charging of aerosols may be facilitated.

The second electrode 40 and the third electrode 50 may be disposed on the same plane with respect to the first direction (A→A'). According to the present disclosure, because the second electrode 40 and the third electrode 50 are disposed adjacent to each other, the electric field between the discharge portion 46 of the second electrode 40 and the corresponding portion 56 of the third electrode 50 is formed strong so that charging of aerosols may be facilitated.

The third electrode 50 may be disposed to be spaced apart from the second electrode 40 in a direction opposite to the first direction (A→A') to form a electrification space between the discharge portion 46 and the corresponding portion 56 in the first direction (A→A'). According to the present disclosure, aerosols in the air may be charged in the electrification space. In addition, because the corresponding portion 56 is disposed upstream of the discharge portion 46, a phenomenon in which a voltage difference between the discharge portion 46 and the corresponding portion 56 is reduced due to excessive collection of ions released from the discharge portion 46 in the corresponding portion 56 may be prevented.

The second electrode 40 may include the one end 40*a* of the second electrode and the other end 40*b* of the second electrode disposed further downstream than the one end 40*a* of the second electrode with respect to the first direction (A→A'), the third electrode 50 may include the one end 50*a* of the third electrode and the other end 50*b* of the third electrode disposed further downstream than the one end 50*a* of the third electrode with respect to the first direction (A→A'), and the discharge portion 46 may be disposed at the one end 40*a* of the second electrode and the corresponding portion 56 may be disposed at the other end 50*b* of the third electrode. According to the present disclosure, the discharge portion 46 and the corresponding portion 56 may be disposed at the edges of the electrodes to induce the corona discharge to easily occur.

The first electrode 30 may include the one end 30*a* of the first electrode and the other end 30*b* of the first electrode disposed further downstream than the one end 30*a* of the first electrode with respect to the first direction (A→A'), and the length from the one end 50*a* of the third electrode to the other end 40*b* of the second electrode with respect to the first direction (A→A') may be provided to be longer than the length from the one end 30*a* of the first electrode to the other end 30*b* of the first electrode. According to the present disclosure, as the separation space between the third electrode and the second electrode is provided to be large, the electrification space may be secured to be large.

The upper surface 45*a* and lower surface 45*b* of the second electrode layer 45 may be disposed inside the second dielectric layer 41 with respect to the second direction (B→B'), and the upper surface 55*a* and lower surface 55*b* of the third electrode layer 55 may be disposed inside the third dielectric layer 51 with respect to the second direction (B→B'). The discharge portion 46 may be formed on the side surface 45*c* connecting the upper surface 45*a* and lower surface 45*b* of the second electrode layer 45, and the corresponding portion 56 may be formed on the side surface 55*c* connecting the upper surface 55*a* and lower surface 55*b* of the third electrode layer 55. According to the present disclosure, the discharge portion 46 and the corresponding portion 56 may be disposed at the edges of the electrodes to induce the corona discharge to easily occur.

The discharge portion 46 may be provided such that the closer the discharge portion is to the corresponding portion 56, the smaller an area with respect to the third direction (C→C') orthogonal to the first direction (A→A') and the second direction (B→B') becomes. According to the present disclosure, as the discharge portion 46 may have a shape protruding toward the corresponding portion 56, an area in which the corona discharge is concentrated may be provided.

The discharge portion 46 may include a triangular shape with the vertex 47 being the point closest to the corresponding portion 56 with respect to the first direction (A→A'). According to the present disclosure, as the corona discharge occurs intensively at the vertex 47, the charging action may be effectively induced.

The corresponding portion 56 may extend in a straight line along the third direction (C→C') orthogonal to the first direction (A→A') and the second direction (B→B'). According to the present disclosure, by making it difficult for ions to be released from the corresponding portion 56, ions may be induced to be released relatively easily from the discharge portion 46. Therefore, the charging action between the discharge portion 46 and the corresponding portion 56 may be effectively induced.

The first electrode 30 may include the first dust collection portion 39 through which aerosols are collected, the second electrode 40 may include the second dust collection portion 49 forming an electric field with the first dust collection portion 39, and the second dust collection portion 49 may extend from the discharge portion 46. The discharge portion 46 and the second dust collection portion 49 may be formed integrally. According to the present disclosure, the dust collection sheet 10 may simultaneously perform the functions of charging and collecting aerosols by including both the discharge portion 46 and the dust collection portions 39 and 49.

The number of the third electrodes 50 may be provided to be equal to the number of the second electrodes 40. According to the present disclosure, because the numbers of the discharge portion 46 and corresponding portion 56 are provided equally, the charging action may occur effectively.

The dust collection sheet 10 according to an embodiment of the present disclosure, which is provided to collect aerosols in the air, may include the first electrode 30 including the first dielectric layer 31 and the first electrode layer 35 within the first dielectric layer 31, and to which the first voltage is applied to collect aerosols; the second electrode 40 arranged alternately with the first electrode 30, including the second dielectric layer 41 and the second electrode layer 45 within the second dielectric layer 41, and to which the second voltage higher than the first voltage is applied to form an electric field with the first electrode 30; the third electrode 50 disposed to be spaced apart from the second electrode 40, including the third dielectric layer 51 and the third electrode layer 55 within the third dielectric layer 51, and to which the first voltage is applied; the discharge surface 45*c* formed on the second electrode 40 such that the second electrode layer 45 is open to release ions; and the corresponding surface 55*c* formed on the third electrode 50 such that the third electrode layer 55 is open to be disposed parallel to the discharge surface 45*c*. According to the present disclosure, the dust collection sheet 10 may simultaneously perform the functions of charging and collecting aerosols in the air. Therefore, the manufacturing costs may be reduced and the space utilization may be increased. In addition, because the corresponding portion 56 and the discharge portion 46 are arranged in parallel, the corona discharge may occur more effectively so that charging of aerosols may be facilitated.

The second electrode 40 and the third electrode 50 may extend along one direction (A→A') from the upper stream toward the lower stream of the air flow path, and the corresponding surface 55*c* may be disposed upstream of the discharge surface 45*c* with respect to the one direction (A→A'). According to the present disclosure, because the corresponding surface 55*c* is disposed upstream of the discharge surface 45*c*, a phenomenon in which a voltage difference between the discharge surface 45*c* and the corresponding surface 55*c* is reduced due to excessive collection of ions released from the discharge surface 45*c* in the corresponding surface 55*c* may be prevented.

The second electrode 40 may include the one end 40*a* of the second electrode and the other end 40*b* of the second electrode disposed further downstream than the one end 40*a* of the second electrode with respect to the one direction (A→A'), and the discharge surface 45*c* may be disposed at the one end 40*a* of the second electrode. The third electrode 50 may include the one end 50*a* of the third electrode and the other end 50*b* of the third electrode disposed further downstream than the one end 50*a* of the third electrode with respect to the one direction (A→A'), and the corresponding surface 55*c* may be disposed at the other end 50*b* of the third electrode. According to the present disclosure, the discharge surface 45*c* and the corresponding surface 55*c* may be disposed at the edges of the electrodes to induce the corona discharge to easily occur.

The number of the corresponding surfaces 55*c* may be provided to be equal to the number of the discharge surfaces 45*c*. According to the present disclosure, the charging action may occur effectively.

The electrostatic precipitator 1 according to an embodiment of the present disclosure may include the first electrode 30 extending along the first direction (A-+A') from the upper stream toward the lower stream of the air flow path and including the first dielectric layer 31 and the first electrode layer 35 disposed within the first dielectric layer 31 to be grounded; the second electrode 40 disposed in the second direction (B→B') orthogonal to the first direction (A→A') of the first electrode 30, including the second dielectric layer 41 and the second electrode layer 45 disposed within the second dielectric layer 41, and to which a voltage is applied; and the third electrode 50 disposed in a direction opposite to the first direction (A→A') of the second electrode 40 and including the third dielectric layer 51 and the third electrode layer 55 disposed within the third dielectric layer 51 to be grounded, wherein the second electrode 40 may include the discharge portion 46 provided such that the second electrode layer 45 is open toward the direction opposite to the first direction (A→A'), and the third electrode 50 may include the corresponding portion 56 provided such that the third electrode layer 55 is open toward the first direction (A→A') to occur the charging action together with the discharge portion 46. According to the present disclosure, the structure of the electrostatic precipitator 1 may be simplified, the manufacturing costs may be reduced, and the space utilization may be increased. In addition, because the discharge portion 46 is open toward the upper stream of the air flow path and the corresponding surface 55*c* is open toward the lower stream of the air flow path, the phenomenon in which the voltage difference between the discharge portion 46 and the corresponding portion 56 reduced due to excessive collection of ions released from the discharge portion 46 in the corresponding portion 56 may be prevented.

According to the present disclosure, a dust collection sheet and an electrostatic precipitator can simultaneously perform functions of charging and collecting aerosols in the air.

According to the present disclosure, the structures of the dust collection sheet and electrostatic precipitator can be simplified and the convenience of manufacturing can be increased.

According to the present disclosure, the space utilization can be increased by slimming the dust collection sheet and electrostatic precipitator.

The foregoing has illustrated and described specific embodiments. However, it should be understood by those of skilled in the art that the present disclosure is not limited to the above-described embodiments, and various changes and modifications may be made without departing from the technical idea of the present disclosure described in the following claims.

What is claimed is:

1. A dust collection sheet comprising:

a first electrode extending in a first direction from an upper stream of an air flow path toward a lower stream of the air flow path, the first electrode comprising a first electrode layer to which a first voltage is applied and a first dielectric layer covering the first electrode layer;

a second electrode disposed in a second direction orthogonal to the first direction, the second electrode comprising a second electrode layer to which a second voltage is applied and a second dielectric layer covering the second electrode layer, wherein the second voltage is different from the first voltage; and a third electrode disposed parallel to the second electrode in the first direction, the third electrode comprising a third electrode layer to which a third voltage is applied and a third dielectric layer covering the third electrode layer, wherein the third voltage is different from the second voltage, wherein the second electrode further comprises a discharge portion, the discharge portion comprising a portion of the second electrode layer that is not covered by the second dielectric layer such that the third electrode layer is exposed to outside to occur charging action, and wherein the third electrode comprises a corresponding portion facing the discharge portion, the corresponding portion comprising a portion of the third electrode layer that is not covered by the third dielectric layer.

2. The dust collection sheet of claim 1, wherein the discharge portion and the corresponding portion are arranged in a straight line with respect to the first direction.

3. The dust collection sheet of claim 2, wherein the second electrode and the third electrode are on the same plane.

4. The dust collection sheet of claim 1, wherein the third electrode is spaced apart from the second electrode in a direction opposite to the first direction to form an electrification space between the discharge portion and the corresponding portion.

5. The dust collection sheet of claim 4, wherein the second electrode further comprises a first end and a second end, and the first end of the second electrode is on the upper stream side of the second end of the second electrode relative to the first direction, wherein the third electrode comprises a first end and a second end, and the second end of the third electrode is on the lower stream side of the first end of the third electrode relative to the first direction, and wherein the discharge portion is at the first end of the second electrode and the corresponding portion is disposed at the second end of the third electrode.

6. The dust collection sheet of claim 5, wherein the first electrode comprises a first end and a second end, and the second end of the first electrode is on the lower stream side of the first end of the first electrode relative to the first direction, and wherein a length from the first end of the third electrode to the second end of the second electrode, along the first direction, is longer than a length from the first end of the first electrode to the second end of the first electrode.

7. The dust collection sheet of claim 5, wherein an upper surface and a lower surface of the second electrode layer are inside the second dielectric layer on opposite sides of the second electrode in the second direction, and wherein an upper surface and a lower surface of the third electrode layer are inside the third dielectric layer on opposite sides of the third electrode in the second direction.

8. The dust collection sheet of claim 7, wherein the discharge portion is on a side surface of the second electrode layer connecting the upper surface and the lower surface of the second electrode layer, and wherein the corresponding portion is on a side surface of the third electrode connecting the upper surface and the lower surface of the third electrode layer.

9. The dust collection sheet of claim 1, wherein an area of the discharge portion in a third direction orthogonal to the first direction and the second direction is reduced based on a reduction in a distance between the discharge portion and the corresponding portion.

10. The dust collection sheet of claim 9, wherein the discharge portion has a triangular shape with a vertex being a point closest to the corresponding portion in the first direction.

11. The dust collection sheet of claim 1, wherein the corresponding portion extends in a straight line along a third direction orthogonal to the first direction and the second direction.

12. The dust collection sheet of claim 1, wherein the first electrode comprises a first dust collection portion configured to collect aerosols, wherein the second electrode comprises a second dust collection portion configured to form an electric field with the first dust collection portion, and wherein the second dust collection portion extends from the discharge portion.

13. The dust collection sheet of claim 12, wherein the discharge portion and the second dust collection portion are formed integrally.

14. The dust collection sheet of claim 1, further comprising:

one or more second electrodes including the second electrode; and one or more third electrodes including the third electrode, wherein a number of the one or more third electrodes is equal to a number of the one or more second electrodes.

15. A dust collection sheet comprising:

a plurality of first electrodes extending in a first direction, wherein each first electrode of the plurality of first electrodes comprises:

a first electrode layer configured to receive a first voltage; and a first dielectric layer covering a portion of the first electrode layer;

a plurality of second electrodes, wherein each second electrode of the plurality of second electrodes comprises:

a second electrode layer configured to receive a second voltage;

a second dielectric layer covering a portion of the second electrode layer; and a discharge portion comprising a portion of the second electrode layer that is not covered by the second dielectric layer; and a plurality of third electrodes, wherein each third electrode of the plurality of third electrodes comprises:

a third electrode layer configured to receive a third voltage;

a third dielectric layer covering a portion of the third electrode layer; and a corresponding portion comprising a portion of the third electrode layer that is not covered by the third dielectric layer, wherein each second electrode of the plurality of second electrodes is adjacent to a first electrode of the plurality of first electrodes in a second direction, wherein the corresponding portion of each third electrode of the plurality of third electrodes faces the discharge portion of a second electrode of the plurality of second electrodes, wherein each third electrode of the plurality of third electrodes is adjacent to a second electrode of the plurality of second electrodes in the first direction, wherein the second voltage is different from the first voltage, and the third voltage is different from the second voltage, and wherein the plurality of second electrodes and the plurality of third electrodes are configured to cause a charging action to occur with the discharge portion for each respective second electrode of the plurality of second electrodes.

16. The dust collection sheet of claim 15, wherein the discharge portion of each second electrode of the plurality of second electrodes is aligned in the first direction with the corresponding portion of a third electrode of the plurality of third electrodes.

17. The dust collection sheet of claim 16, wherein each second electrode of the plurality of second electrodes is on the same plane as a third electrode of the plurality of third electrodes.

18. The dust collection sheet of claim 15, further comprising an upstream side configured to receive an airflow; and a downstream side opposite from the upstream side, wherein each third electrode of the plurality of third electrodes is spaced apart from a second electrode of the plurality of second electrodes in the first direction to form an electrification space between the discharge portion and the corresponding portion.

19. The dust collection sheet of claim 18, wherein each second electrode of the plurality of second electrodes further comprises a first end and a second end, wherein the first end of each second electrode of the plurality of second electrodes is on a side of the respective second electrode closest to the upstream side, wherein each third electrode of the plurality of third electrodes comprises a first end and a second end, wherein the second end of each third electrode of the plurality of third electrodes is on a side of the respective third electrode closest to the downstream side, and wherein the discharge portion of each second electrode of the plurality of second electrodes is at the first end of the respective second electrode and the corresponding portion of each third electrode of the plurality of third electrodes is at the second end of the respective third electrode.

20. The dust collection sheet of claim 15, wherein the discharge portion of each second electrode of the plurality of second electrodes has a saw-toothed shape.

* * * * *